May 14, 1946.  C. W. MOTT  2,400,250
METHOD AND MACHINE FOR MAKING SURGICAL SPONGES
Filed July 22, 1943  15 Sheets-Sheet 1

Inventor:
Carl W. Mott
By
Atty.

May 14, 1946.    C. W. MOTT    2,400,250
METHOD AND MACHINE FOR MAKING SURGICAL SPONGES
Filed July 22, 1943    15 Sheets-Sheet 3

Inventor:
Carl W. Mott
By
Atty.

May 14, 1946.  C. W. MOTT  2,400,250
METHOD AND MACHINE FOR MAKING SURGICAL SPONGES
Filed July 22, 1943  15 Sheets-Sheet 4

Inventor:
Carl W. Mott
By [signature]
Atty.

May 14, 1946. C. W. MOTT 2,400,250
METHOD AND MACHINE FOR MAKING SURGICAL SPONGES
Filed July 22, 1943 15 Sheets-Sheet 6

Inventor
Carl W. Mott

May 14, 1946. C. W. MOTT 2,400,250
METHOD AND MACHINE FOR MAKING SURGICAL SPONGES
Filed July 22, 1943 15 Sheets-Sheet 9

Inventor:
Carl W. Mott
By
Atty.

May 14, 1946.   C. W. MOTT   2,400,250
METHOD AND MACHINE FOR MAKING SURGICAL SPONGES
Filed July 22, 1943   15 Sheets-Sheet 11

Inventor:
Carl W. Mott
By [signature]
Atty.

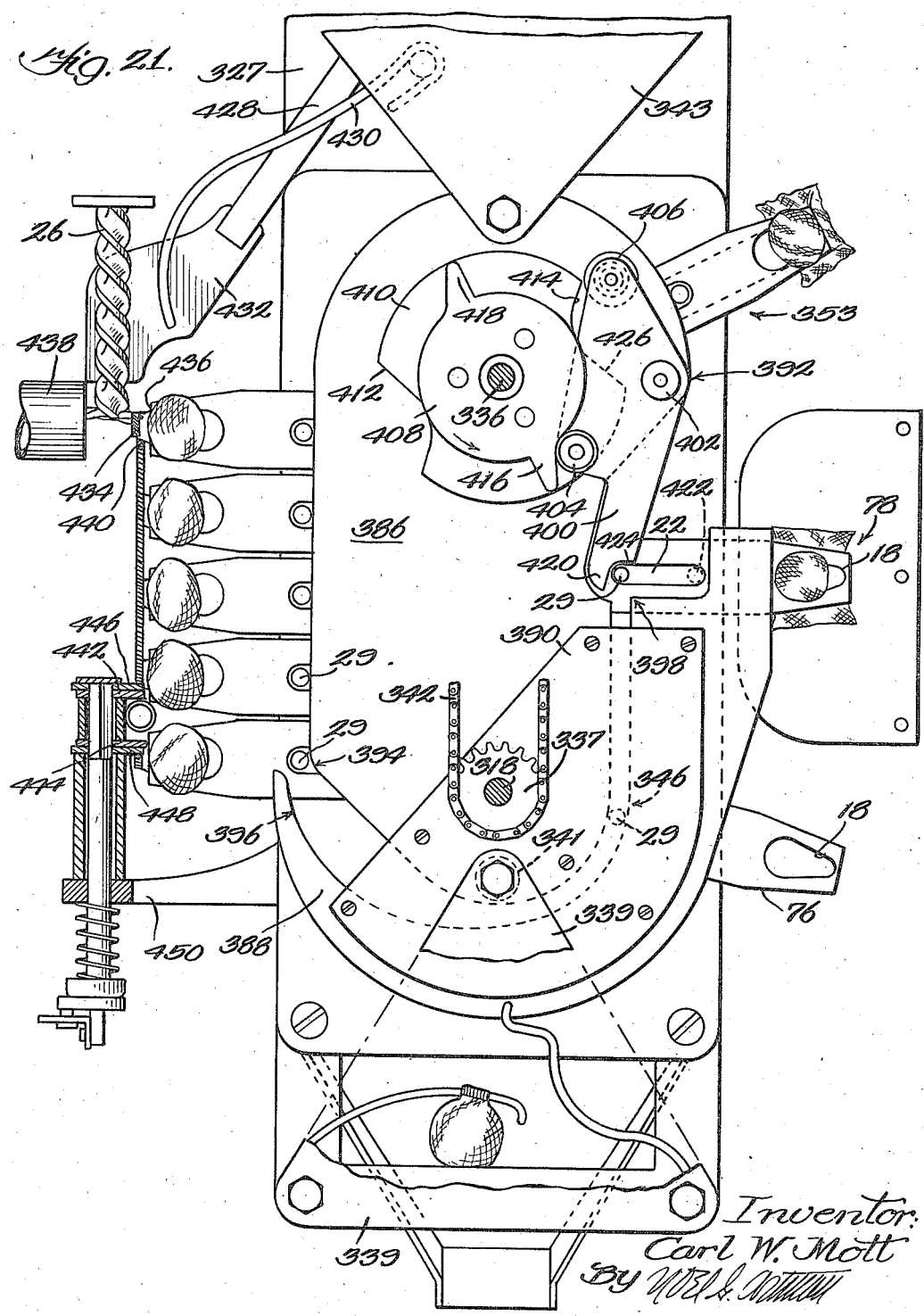

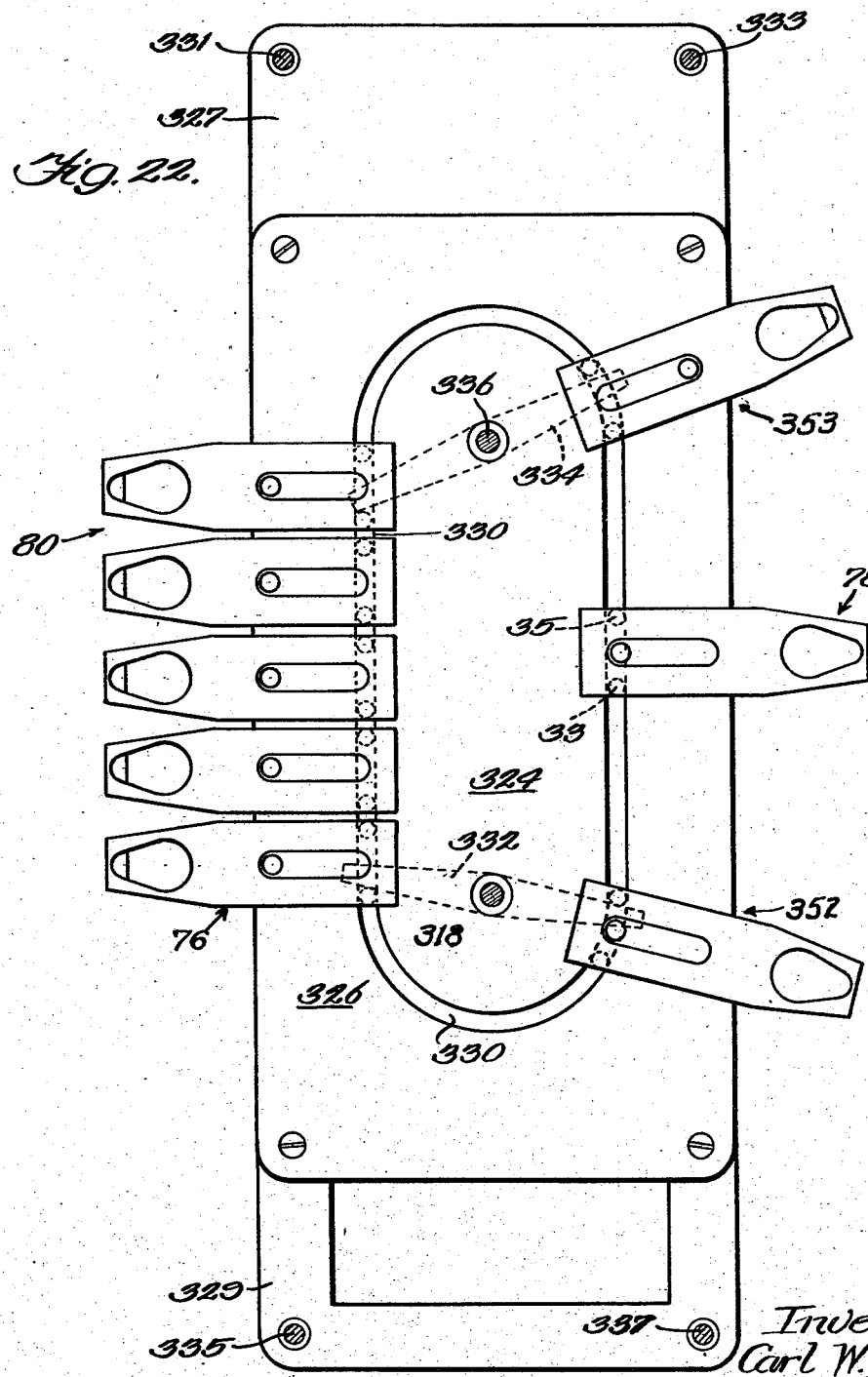

May 14, 1946.  C. W. MOTT  2,400,250
METHOD AND MACHINE FOR MAKING SURGICAL SPONGES
Filed July 22, 1943    15 Sheets-Sheet 14

Inventor:
Carl W. Mott
By
Atty.

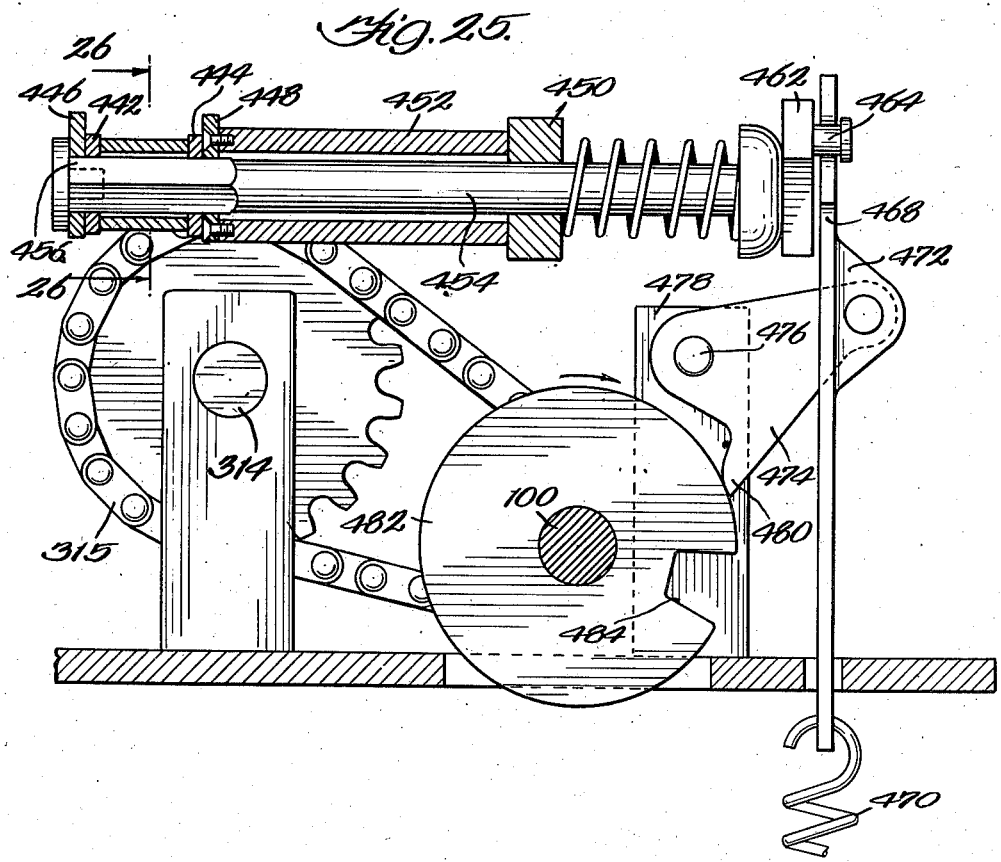

Patented May 14, 1946

2,400,250

UNITED STATES PATENT OFFICE 2,400,250

METHOD AND MACHINE FOR MAKING SURGICAL SPONGES

Carl W. Mott, La Grange, Ill., assignor to Howard C. Riordan, Oak Park, Ill.

Application July 22, 1943, Serial No. 495,785

42 Claims. (Cl. 226—53)

This invention relates to a method of making that type of surgical dressing wherein a piece of absorbent material such as cotton batting is positioned within a porous envelope, such as a gauze wrapping, and for a machine for practicing this invention.

In surgical and dental fields there is a demand for an absorbent dressing consisting of a cotton center positioned within a gauze casing. This dressing is commonly called a surgical sponge and in certain applications is deemed superior to uncovered cotton batting because the casing of gauze is much less likely to adhere to whatever the sponge is positioned against. These sponges may be of various sizes but quite commonly are substantially round and vary in size from one-half inch to one inch in diameter. While the gauze is obtainable in roll form, the centers must be cut from a cotton batting rope and hence before formation, each center is a small cylinder of cotton batting.

The broad object of this invention is to provide a method of positioning a cylindrical section of soft absorbent material within a swatch of casing material such as gauze in such a way that the soft absorbent center is compressed somewhat into the shape of a ball. A subsidiary object is to provide a method and a machine for practicing the method which is capable of functioning rapidly so that these comparatively inexpensive surgical dressings may be produced inexpensively. One of the features of applicant's method is the forcing of a cylindrical segment of cotton rope through a ring or open ended thimble disposed at right angles to the axis of the rope, whereby the cylindrical shape of the rope is lost. As a next step, applicant forces the deformed center section against a flat swatch of gauze which is lying next to a restricted opening. The center section is pushed through this restricted opening carrying with it that portion of the gauze which it actually engages leaving on the first side of the opening the tails of the gauze. The means for pushing the center section into this position is then withdrawn and concurrently a pinching means is moved across the opening so as to pinch together the loose ends of the gauze. This pinching member consists of a plate which is lying against another plate in which the hole first mentioned exists.

By this arrangement of parts, applicant's method of assembling a surgical sponge is seen to consist of an operation of forcing a center member against a casing then squeezing down on the tails of the casing in such a way as to draw the casing tightly over the center member. Thereafter the tails of the casing are cut and the stitching operation is performed.

Another object of this invention is to provide a new and improved means of feeding gauze and cotton rope into a predetermined relationship to each other preparatory to an assembling operation. The stiffness or structural strength of gauze is so little that it is difficult to move it rapidly step by step along a horizontal table. One of the features of applicant's improved method of making these surgical sponges resides in the step of feeding both the gauze and the cotton batting rope downwardly into a selected relationship to one another and then moving those portions of the gauze and the cotton batting rope which are to be assembled together into a single surgical sponge into a horizontal position for performing the assembling operation. This method of feeding the two textiles downwardly with gravity into a selected relative relationship to each other preparatory to cutting and assembling, dispenses with certain feed rolls, positioning means and the like which would be necessary if the feeding took place horizontally along a table.

Another object of this invention is to provide a machine which will accumulate several assembled surgical sponges at a stitching station and feed them at a constant speed to a stitcher even through each assembled sponge leaves the assembling station during but a small portion of one cycle of the machine. The assembling of the cotton batting center with the gauze casing may require $x$ units of time, while the stitching of the free ends of the gauze casing to form the ball may require several $x$ units of time. With ordinary stitching equipment, the stitching operation cannot be reduced to $x$ units of time. On the other hand, each assembling operation is separated from the next assembling operation by several units of time in order to provide time for feeding and positioning the gauze and the cotton batting with respect to each other. One of the features of this invention is the provision of a continuously operating stitching needle.

Another object of this invention is to provide a new and improved means of controlling the gauze wastage or tails during and after the stitching and final cutting operations, including the removal of the completed surgical sponge from the machine. In handling cotton or other fluffy textile material, it is essential that the working parts of the machines be kept clean of loose threads and fibers cut from the main body of the material by knives. In particular, it is necessary to hold the gauze which is about to be fed to the needle of the stitching machine, in such a way that a clean stitch can be made adjacent to which a clean knife cut may be made. A feature of applicant's device is the employment of a small worm or spiral which catches the free ends or tails of the gauze and moves them between itself and a flat plate where the tails are held during the stitching and cutting operations.

Another object of this invention is to provide a novel carriage for feeding the two major components of the surgical sponge downwardly into a proper relationship with respect to each other and then horizontally into a proper relationship with an assembling means. Broadly, applicant feeds cotton batting rope and a band of gauze into a carriage which moves the two along parallel planes downwardly during a feeding step. At the conclusion of the feeding step, the carriage rotates 90 degrees on a horizontal axis, thereby bringing the planes of the two materials substantially horizontal. When they reach this horizontal position the portions thereof that are to be used for a single surgical dressing are immediately beneath an assembling means. By moving the carriage from a horizontal position to a vertical position and back to a horizontal position one cycle of the feeding and assembling operation is accomplished. Additionally, in order to keep down the weight of the carriage, neither the roll of gauze nor the supply of cotton batting are mounted.

There are many other features in applicant's invention. The various parts of the feeding, cutting and assembling mechanism function in response to fixed position cams, that is fixed with relationship to the frame of the machine. Another feature of the device resides in the transfer table by which the applicant carries each assembled surgical sponge from the assembling stage to a stitching stage at an accelerated speed whereby it is possible for the stitching step to be performed more slowly than the assembling step.

In the drawings:

Figure 21 is a view of the conveyor table taken on the line 21—21 of Figure 14;

Figure 22 is a view taken on the line 22—22 of Figure 14.

Figure 25 is a view taken on the line 25—25 of Figure 14 and shows the mechanism for functioning the cutter between stitches; and Figure 26 is a view taken on the line 26—26 of Figure 25.

THE SURGICAL SPONGE AND THE GENERAL METHOD OF FORMING IT

Figure 1:
Figure 1 is a perspective view of a finished surgical sponge of the type produced by applicant's machine.
Figure 2:
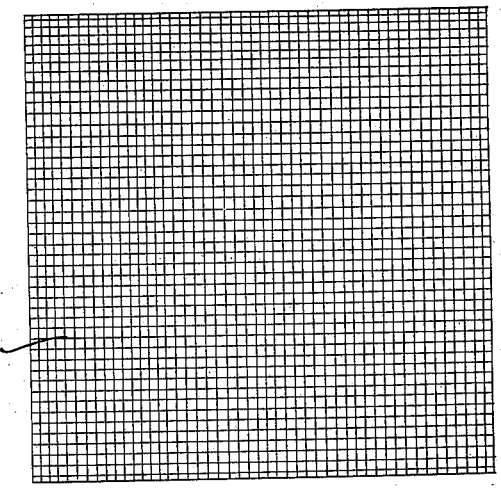
Figure 2 is a swatch of gauze.
Figure 3:
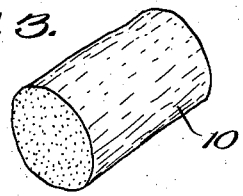
Figure 3 is a section of cotton rope, the two figures being related in size to illustrate the respective sizes of the two principal components of applicant's surgical sponge.
Figure 4:
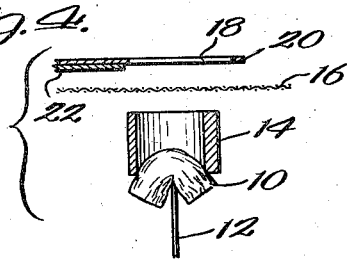
Figure 4 is a schematic illustration showing the first step of positioning a section of cotton rope within the gauze swatch.

Referring to Figures 1 to 7 on the first sheet of the drawings, the surgical sponge is seen in finished form to consist substantially of a ball. This ball is formed of a square swatch of gauze, which is shown in Figure 2, wrapped around a cylindrical section of cotton rope, which is ordinary cotton batting. The first step in forming a sponge is illustrated in Figure 4, wherein a section of cotton batting 10 is being forced by a poker 12 through a ring or open ended thimble 14 to give it a rounded shape. On leaving the thimble, it engages the gauze swatch 16 and on continued upward movement of the poker 12 it passes through an opening 18 in a plate 20. The opening 18 has an ovate shape, see Figure 5. Beneath the plate 20 is a second or pinching plate 22.

Figure 5:
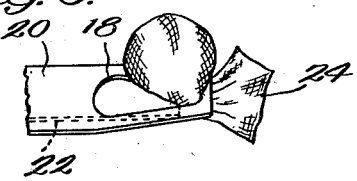
Figure 5 is the second step of drawing the gauze tightly around the section of cotton rope.
Figures 6, 7:
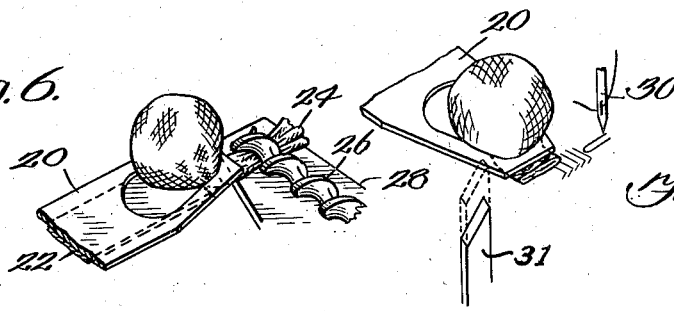
Figure 6 illustrates the positioning of the loose ends or tails of the gauze swatch preparatory to a stitching step which is illustrated in Figure 7.

Referring now to Figure 5, after the section of cotton batting has been pushed through the opening 18 only sufficiently far to leave the corners of the gauze swatch depending below the hole 18, the poker 12 moves back downwardly and concurrently or slightly following the downward movement of the poker, the pinching plate 22 moves to the right closing the hole 18. This forces the neck of the gauze into the small end of the ovate opening 22, leaving the corners of the gauze swatch, commonly called the tails 24, dangling beneath the plates 20 and 22 and because of the action of the plate 22 directed outwardly away from the end of the plate 20.

At this stage of the operations, the two plates 20 and 22 are moved away from the assembling station shown in Figures 4 and 5 to a stitching or sewing station. At the stitching station the sponge holding end of the plates 20 and 22 lie adjacent to a worm shaft 26, see Figure 6, which engages the tails and tends to force the tails against the top surface of a plate 28. This action draws the gauze forming the tails tightly between the plate 28 and the end of the plate 20 so that, referring to Figure 7, a knife 31 severs the tails from the sponge. A needle 30 then performs a stitching operation which binds together the loose ends of the sponge. When this has been done, it is possible to remove the completed sponge by returning the plate 22 to its open position, as in Figure 4, which releases the sponge. Similarly, the tails which are caught between the worm and the plate may be removed from the stitching station with minimum difficulty.

The final step comprises a continuous stitching operation. In applicant's machine the stitching is done at a speed such that it will stitch one surgical sponge during the time required for the feeding and assembling mechanism to assemble one surgical sponge. A plurality of assembled sponges are accumulated at the stitching and cutting stage and the movement of the sponges past the needle and knives is at a constant speed. Inasmuch as the tails are not touching each other but are spaced apart, the needle will be stitching while encountering no fabric. This portion of the stitching is cut off, the cuts being made close to the tails. See Figure 12. Because it is desirable that the stitching on the sponge not readily unravel, a stitch of the lock type may be employed.

Figure 12:
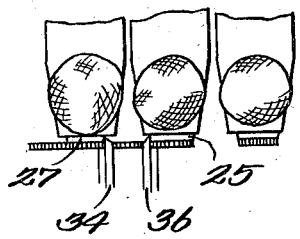
Figure 12 illustrates the last step of separating a plurality of applicant's sponges by cutting away unwanted portions of a continuous stitch.

Referring to Figure 12, the stitching mechanism makes a continuous stitch between each set of tails 24, 25 and 27 and a pair of knives 34 and 36 then sever the unnecessary stitching between adjacent tails such as 25 and 27.

SCHEMATIC PRESENTATION OF APPLICANT'S MACHINE

Because applicant's machine is not easy to understand by studying the drawings, and because fundamentally its design is quite simple, it is thought advisable to schematically present the machine and describe it. After this has been done, one can read the description of the commercial embodiment quite rapidly.

Figure 8:
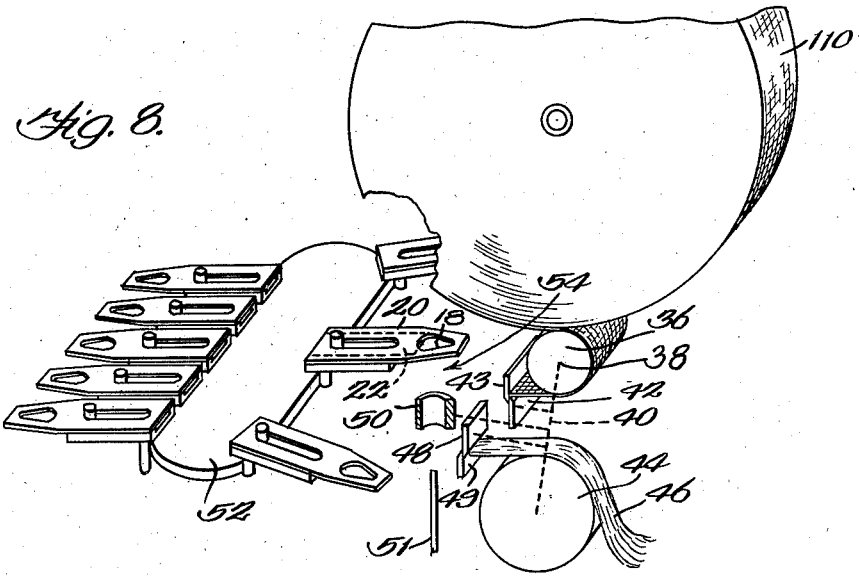
Figure 8 is a schematic view illustrating the position of the feeding and cutting mechanism at the beginning of the first quarter of a cycle.

Referring to Figure 8, 36 identifies a gauze feed roll whose axis 38 constitutes the center about which a carriage suggested by dotted line 40 may pivot. The output of the feed roll 36 is fed between a fixed knife 42 and a movable knife 43 which are shown in closed position. Beneath the gauze feed roll 36 is a cotton rope feed roll 44 which is mounted on the carriage 40 and is adapted to feed cotton rope between a fixed knife 48 and a movable knife 49. The knives 48 and 42 are mounted on the carriage 40 and maintain a fixed relationship to each other. Also mounted on the carriage 40 is a ring or open ended thimble 50. Mounted beneath the open ended thimble 50 is a poker 12, which is provided with means for causing it to pass through the thimble and back out. The relationship of the two sets of knives 42, 43 and 48, 49 and the rate of feed of the two feed rolls 36 and 40 are such that on one cycle of the feeding mechanism, there will be positioned beneath and centrally thereof a short section of cotton rope and there will be positioned above and centrally thereof a square of gauze such as shown in Figure 2.

The member marked 52 is a transfer table, the position of which is substantially constant as shown. It is not affected by movements of the carriage 40. Around the edges of this table are a plurality of sets of assemblage plates such as 20 and 22, heretofore described in connection with Figure 4. Continuing to refer to Figure 8, the two assemblage plates 20 and 22, so identified by numeral, are at what may be described as the assembling station. This station is the point where the opening 18 in the plate 20 is in alignment with the axis of the opening through the ring 50.

The carriage 40 may be rotated around the axis 38, which as will appear in the commercial embodiment is a shaft fixedly positioned in the frame of the machine. It is evident that by moving the carriage 40 counter-clockwise, the ring 50 as well as the knives and the like will be swung downwardly away from the assembling station which is generally identified by the numeral 54. For purposes of explanation, the position shown in Figure 8 will be considered as the first position or the position that opens the cycle of the machine. It will be assumed that the gauze is manually fed past the feed roll 36 up to the edge of the knife 42 which is in closed position and similarly that the cotton rope 46 is fed past the feed roll 44 up to the knife 48 which likewise is in closed position.

Figure 9:
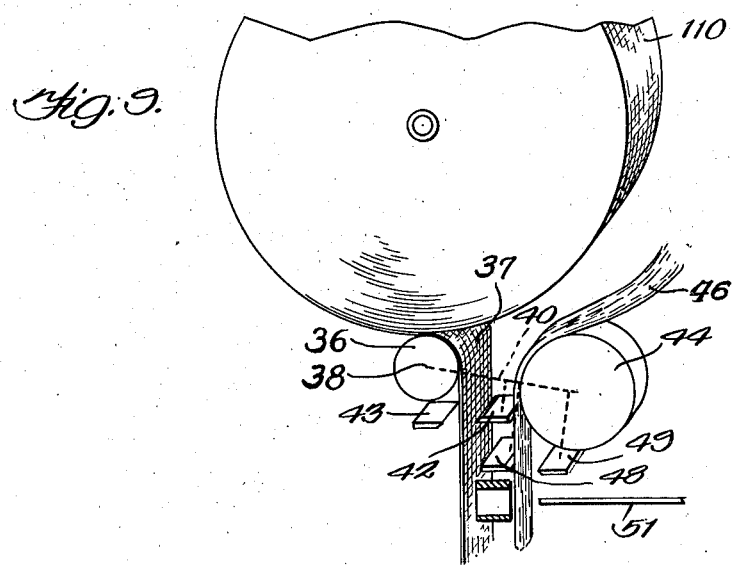
Figure 9 is a schematic view illustrating the position of the feeding and cutting mechanism at the beginning of the second quarter of a cycle.

At this moment, assume that operation of the machine is commenced. On the first quarter-cycle of the machine, the carriage 40 moves counter-clockwise by 90 degrees. During the first part of this movement, the relationship of the gauze 37 to the knife 42 and of the cotton batting rope 46 to the knife 48 does not change because applicant does not wish to move either the gauze or the cotton batting horizontally along a support. Applicant has found it desirable to move the cotton batting and the gauze only when they can be moved downwardly under the influence of gravity. When the carriage 40 has moved 45 to 60 degrees of arc counter-clockwise from the position shown in Figure 8, the feed rolls commence to function. This functioning, however, occurs after the knives 48 and 43 have been retracted from closed position. When the carriage 40 reaches the position shown in Figure 9 which is 90 degrees away from the position shown in Figure 8, the end of the gauze 37 will have dropped well below the knife 42 and similarly the end of the cotton rope 46 will have dropped well below the end of the knife 48.

Figure 10:
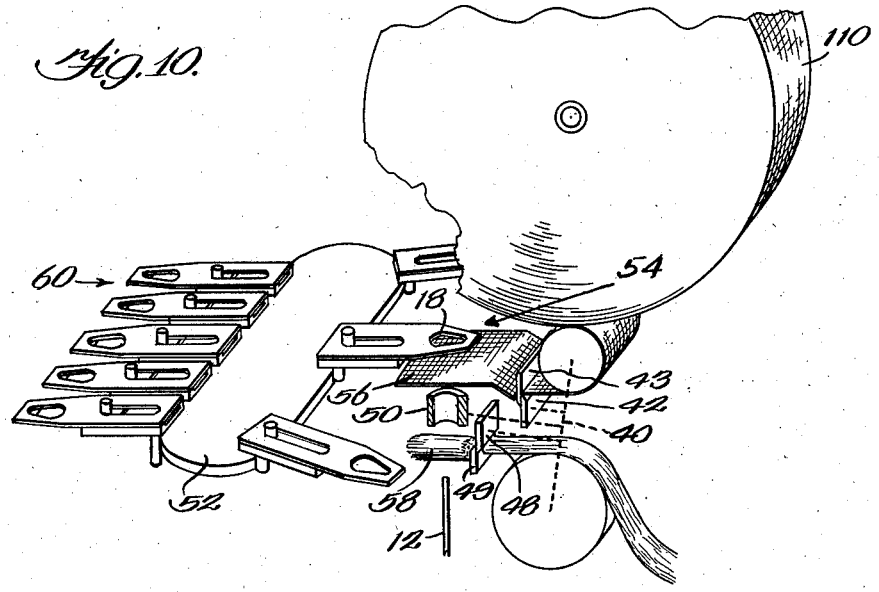
Figure 10 is a schematic illustration of the position of the feeding and cutting mechanism at the beginning of the third quarter of a cycle.

When this counter-clockwise movement of the carriage 40 has been completed, we commence the second quarter of the cycle of the device, namely the movement of the carriage 40 in a clockwise direction back to the position shown in Figure 8. The end of this second quarter of the cycle is illustrated in Figure 10 where the knives 42 and 48 have cut off a section of gauze 56 and a section of cotton rope 58.

Figure 11:
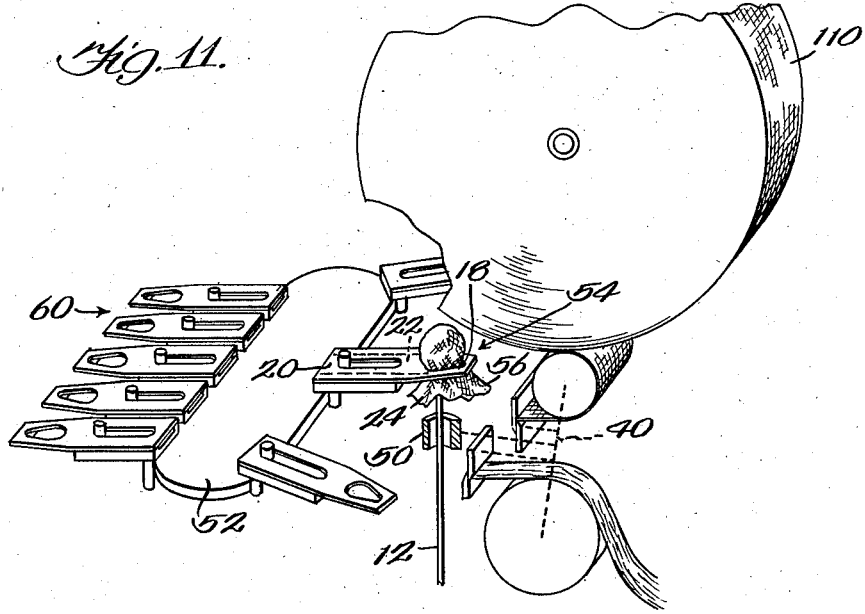
Figure 11 is a schematic illustration of the position of the poker during the assembling operation at the middle of the third and fourth quarters of a cycle.

At this point, the assembling step is performed and it consumes the third and fourth quarters of the cycle. During this assembling step, the carriage 40 remains in fixed position while the poker 12 moves upwardly to force the section of cotton through the open ended thimble 50 against the center of the section of gauze 56, on upwardly through the opening 18 in the plate 20, leaving, as shown in Figure 11, the tails 24 of the gauze trailing beneath the plates 20 and 22. Thereupon the poker 12 returns to the initial position shown in Figure 8 while the lower plate 22 moves to the right as shown in this view, squeezing the neck of the casing holding the absorbent material in the small end of the opening 18.

This constitutes the complete cycle of the feeding, cutting and assembling mechanism. For purposes of description, the first quarter of the cycle may be described as the feeding stage because while the gauze and the cotton rope are not close physically to the assembling station at the end of the quarter, still with respect to the carriage 40, they are in final relationship to each other. The second quarter of the cycle may be described as the positioning stage because the gauze and the cotton rope are brought up next to the assembling means or adjacent to the assembling stage. The third and fourth quarters of the cycle may be described as the assembling stage.

The remainder of the machine is devoted to transferring the assembled sponges to a stationary stitching machine This is done by means of the table 52, which carries means for moving around itself past the assembling station 54 a plurality of sets of plates 20 and 22, which may be called assembling and holding devices. The stitching station is generally identified by the numeral 60 and in applicant's construction is on that side of the transfer table 52 away from the assembling station 54. The method of operation is to move a single assembling device onto and out of the assembling station during one cycle of the machine and after moving an assembling device which is carrying a surgical sponge out of the assembling station, to move it comparatively rapidly over to the stitching station. The stitching station 60 occupies one side of the table 52. The assembling devices are moved slowly through the stitching station, the rate of speed being such that one assembling device will move by approximately its own width during one cycle of the machine. Inasmuch as this side of the table has a length exceeding that of four or five of the widths of the assembling devices, four or five of such devices may be in this station at one time. As will appear hereinafter, the stitching operation occurs in the fore portion of the stitching station while the operation that cuts the excess stitching from the surgical sponges occurs at the end of the stage. It is at the stitching stage that the worm 26 forces the loose tails of the sponges against the plate 28 so that the knife which severs the tails therefrom may more easily function and so that a tight stitch may be made.

With the foregoing schematic description of applicant's apparatus in mind, it will now be possible to describe the commercial embodiment much more quickly.

THE COMMERCIAL MACHINE

Figure 13:
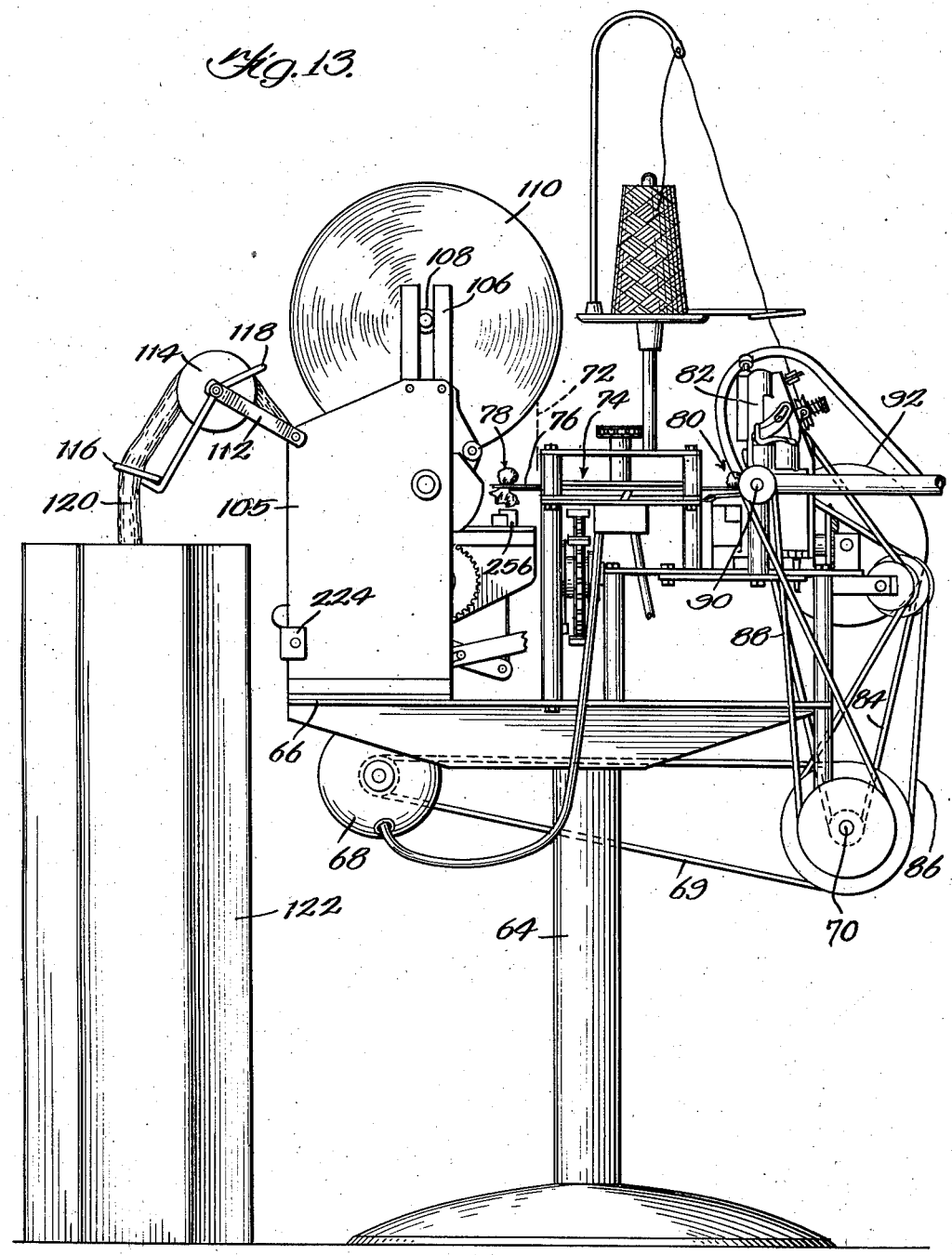
Figure 13 is a side view in elevation of applicant's machine for making surgical sponges.

The commercial machine will be described in an order roughly paralleling the description of the schematic presentation. The commercial machine is presented in Figures 13 to 23. Figure 13 is a front elevation of the machine which is seen to comprise a supporting pedestal 64 and a base plate 66. Suitably suspended from the base plate 66 is a source of power, being an electric motor, 68 which drives by a belt 69 a shaft 70 supporting a plurality of pulleys. The equipment mounted on the base plate 66 may be segregated into three groups. The first group is the feeding and assembling group which is located to the left of the dotted line 72. The second group is a transfer table generally identified by the numeral 74 which performs the service of transferring each sponge assembling device, as for example 76 from an assembling station 78 to the stitching station 60. The third group of equipment is the stitching equipment generally identified by the numeral 82.

The power for operating all of this equipment is derived from the shaft 70 and it follows, therefore, that the speed of each group of the equipment will vary directly with the speed of the shaft 70 and that speeding up the feeding and assembly mechanism will result in speeding up the transfer table and stitching mechanism. The feeding and assembling mechanism and the transfer table are both driven by the main drive belt 84. The stitching mechanism is driven by the belt 86 and a belt 88 drives a worm mechanism generally identified by the numeral 90 for removing gauze scraps from the stitching mechanism.

The first step in describing the commercial device will be to describe the feeding, cutting and assembling mechanism, that is the mechanism located to the left of the dotted line 72 in Figure 13. In doing this reference is first made to Figure 15 wherein it is seen that the main drive belt 84, which was turning a large pulley 92 clockwise in Figure 13 on a shaft 94, is also rotating a mitre gear 96 through a bevel pinion in a clockwise direction as viewed in Figure 15. The mitre gear 96 is mounted on the end of a main drive shaft 100.

Figure 14:
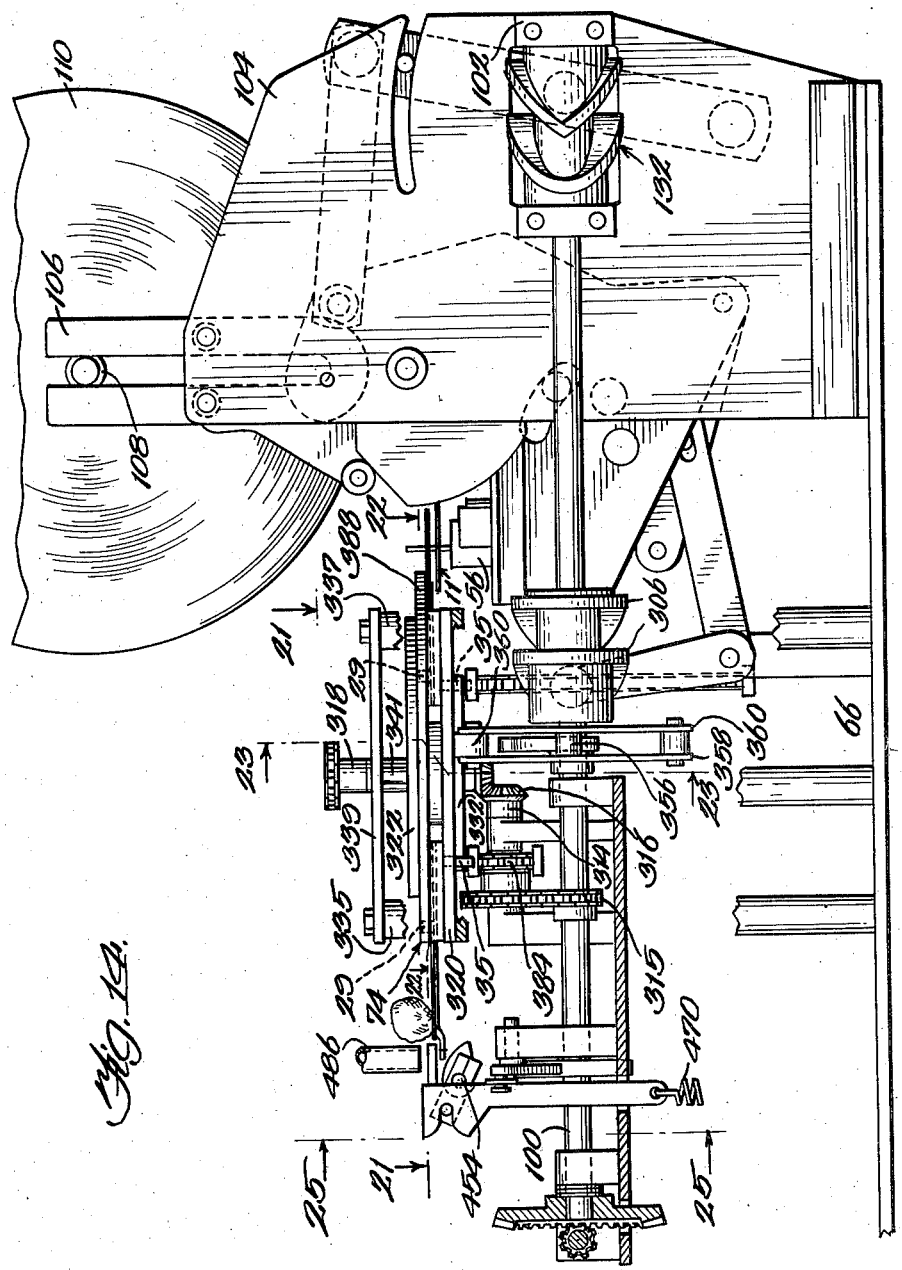
Figure 14 is a rear view partly cut away of applicant's machine.

Referring now to Figure 14 which views the entire device from the back, that is the opposite side from Figure 13, it will be noted that the main drive shaft 100 extends the entire length of the mechanism through the feeding and cutting stage and is journalled at its far end at 102. There rests on the base plate 66 an outside supporting plate 104 upon which is supported an upright U-shaped member 106, between the arms of which for vertical guidance may be positioned a shaft 108 for carrying a spool of gauze 110. Referring to Figure 13, a bracket 112 supports a roller 114 and a pair of guides 116 and 118 for feeding cotton rope 120 from a canister 122 to the feeding and cutting mechanism.

Figure 16:
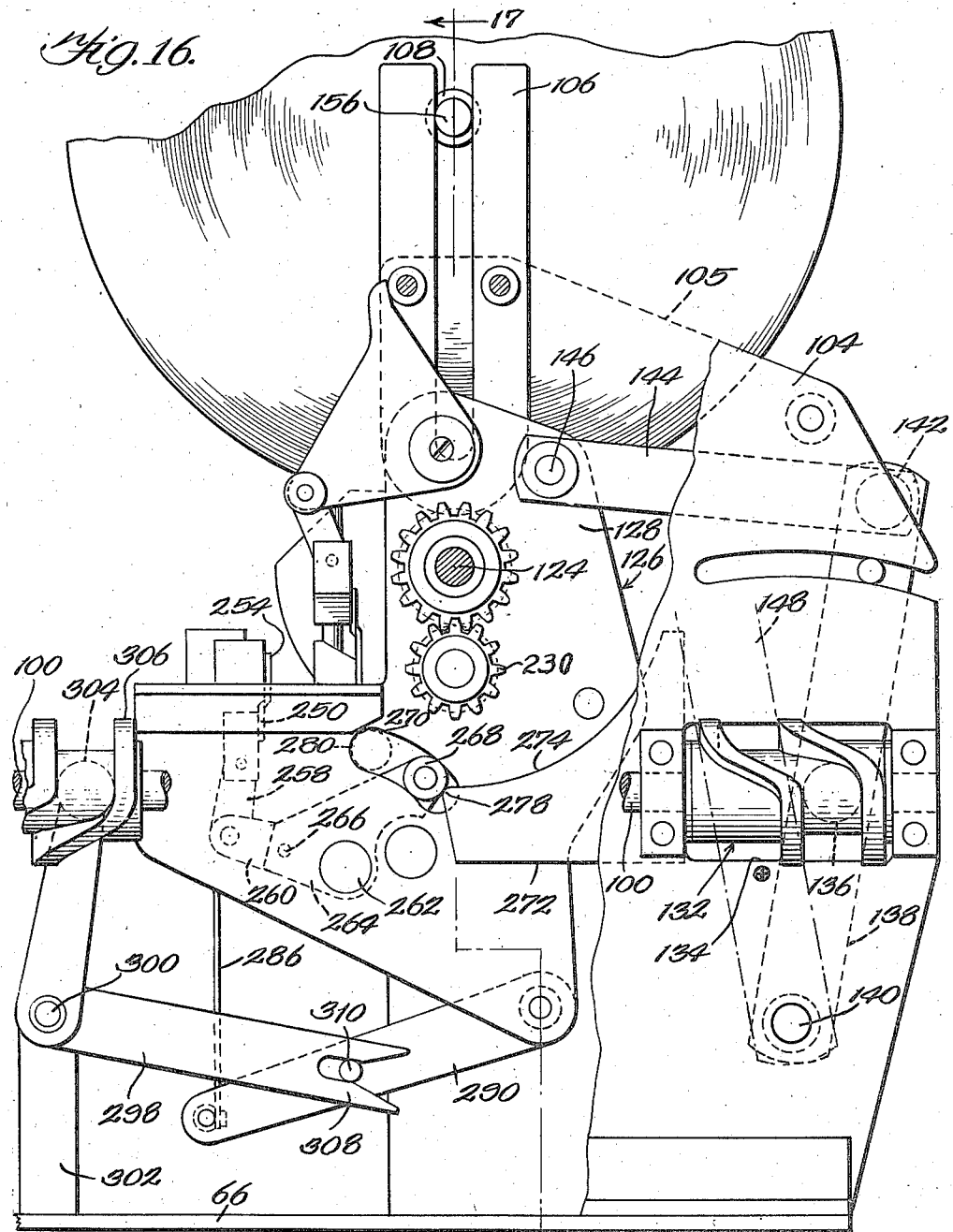
Figure 16 is a rear view in elevation with the front plate removed of the feeding and cutting mechanism only, that is the right half of the device shown in Figure 14.
Figure 17:
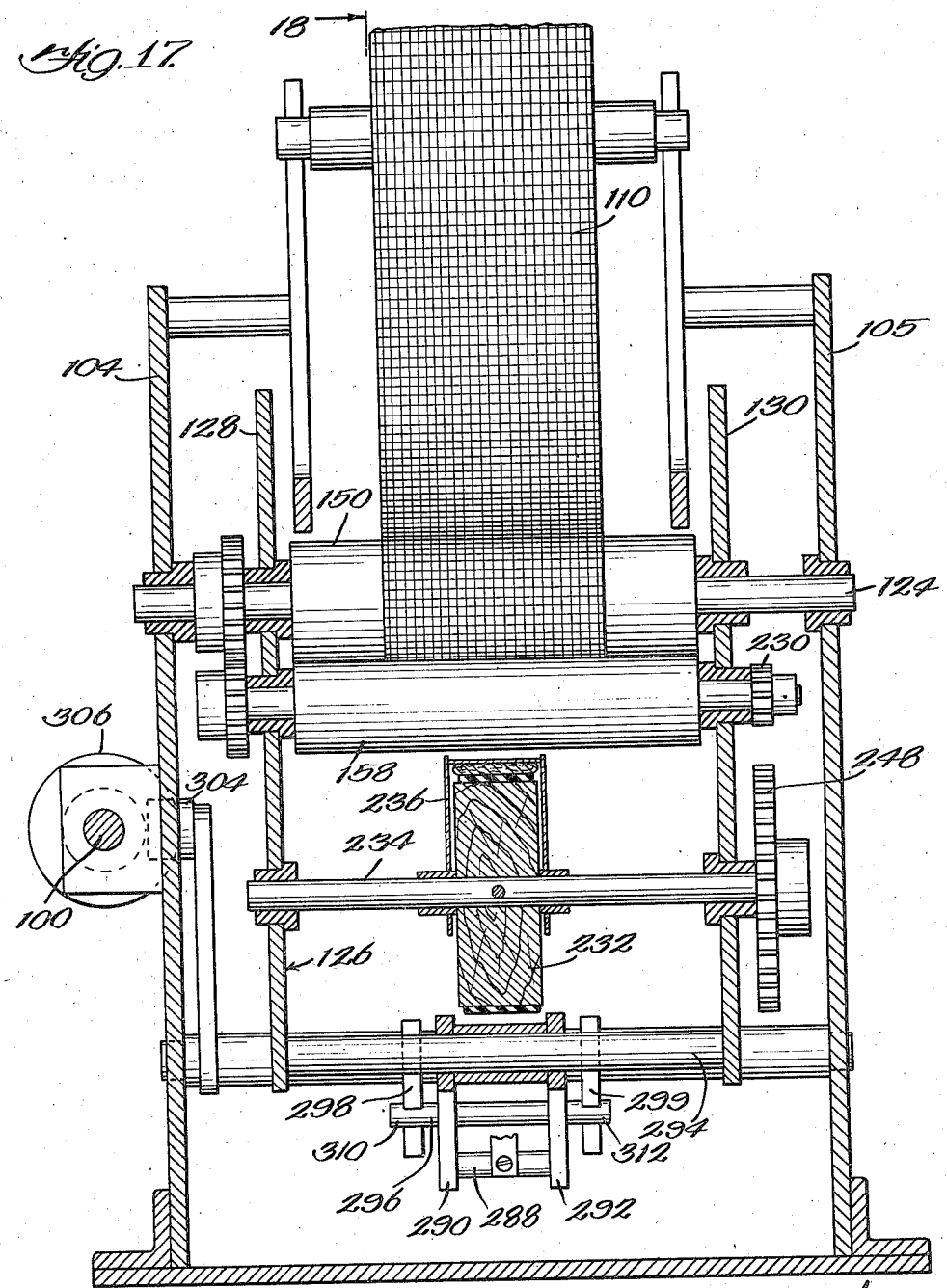
Figure 17 is a view in section taken on the line 17—17 of Figure 16.
Figure 18:
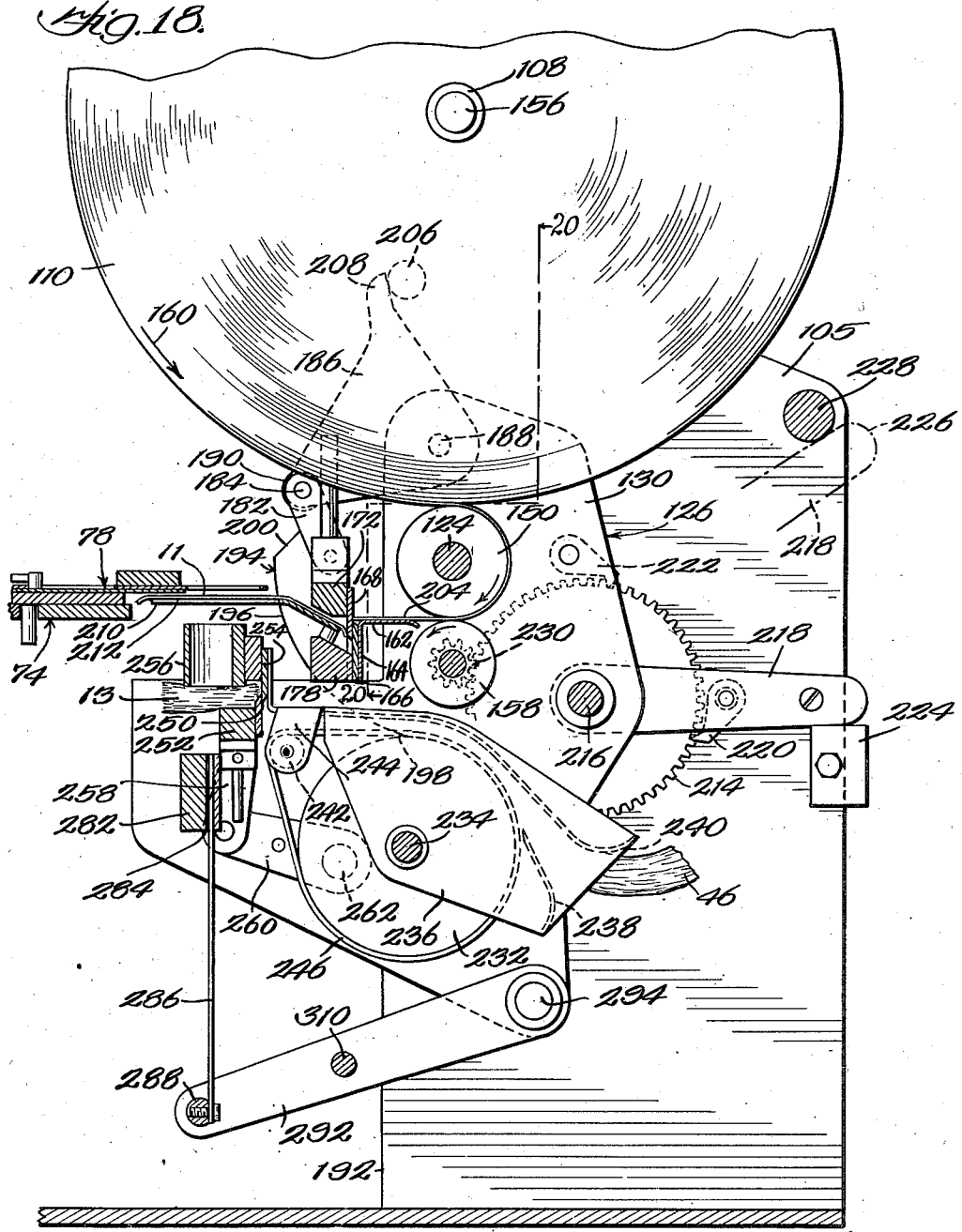
Figure 18 is a view taken along the line 18—18 of Figure 17 and illustrates the step of cutting a section of cotton rope preparatory to wrapping it in a swatch of gauze which is concurrently cut from a roll.
Figure 19:
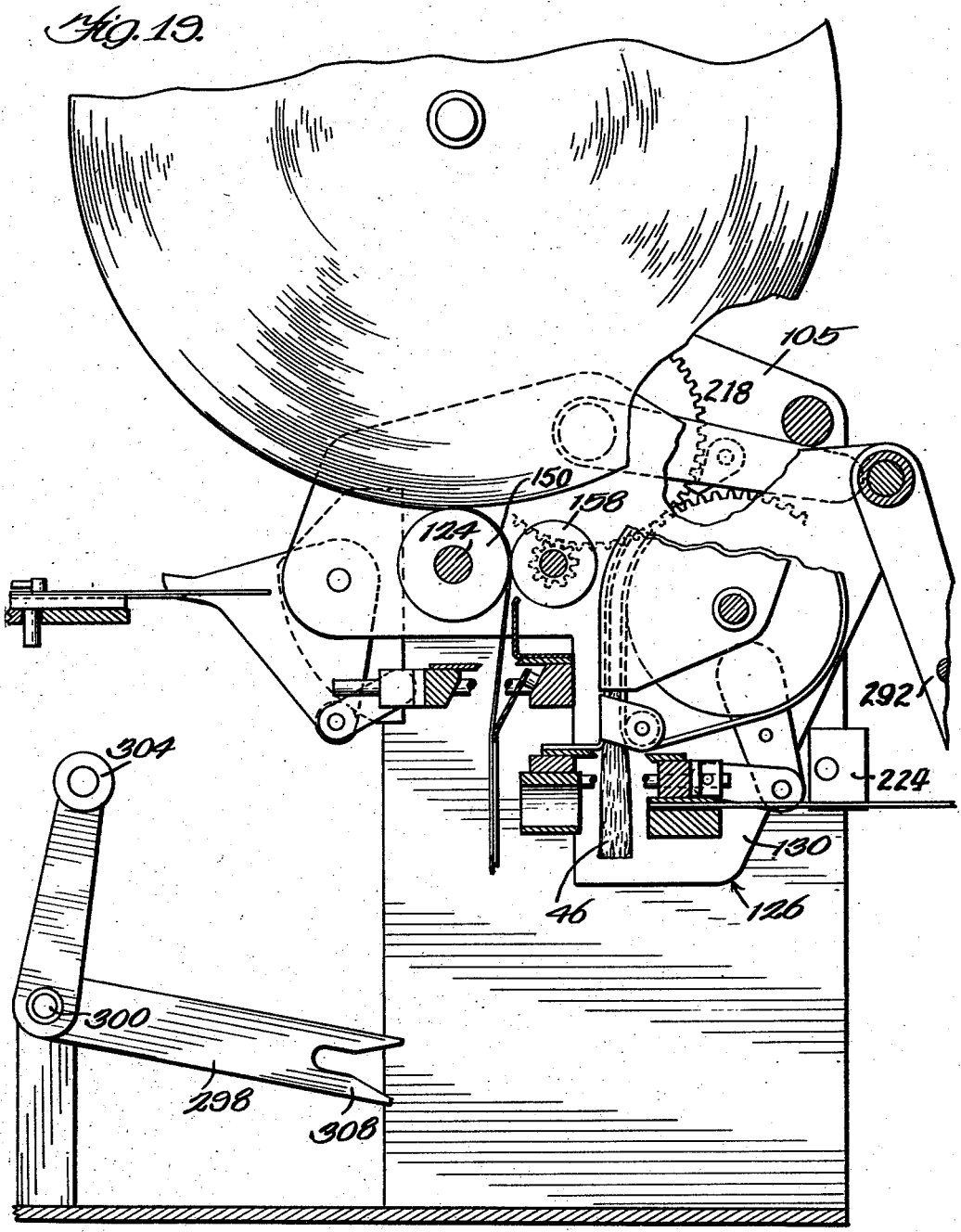
Figure 19 is taken along the line 19—19 of Figure 17 excepting that it shows the device at that stage of operation where it is feeding additional cotton rope and gauze preparatory to cutting.

The feeding and cutting mechanism is shown in Figures 16 to 19, and it should be understood that Figures 16, 18 and 19 are all views taken from the back of the machine, that is from the same side as Figure 14. Referring now to Figure 16, the supporting plate 104 and the complementary plate 105 on the other side, support a cross shaft which will be called the carriage shaft 124. The carriage shaft 124 supports a carriage 126 and which consists of two plates 128 and 130, see Figure 17. Returning now to Figure 16, and recalling that the carriage which was schematically shown in Figures 8 to 11 by the number 40 is to be swung 90 degrees, it will be understood that the carriage 126 will be moved from its position shown in Figure 16 counter-clockwise to its position shown in Figure 19. This movement is around the shaft 124.

Referring to Figure 16, the main drive shaft 100 is in front of the supporting plate 104 and it carries a carriage cam track 132. This cam track which is circular when viewed endwise penetrates a hole 134 in supporting plate 104 through which also projects a roller 136 which is mounted on an arm 138 positioned behind the plate 104 and pivoted on a shaft 140 mounted between the plates 104 and 105. Pivotally connected to the upper end of the arm 138 on a shaft 142 is a link 144 which is pivotally connected to a shaft 146 mounted in the plates 128 and 130 of the carriage 126.

The shaft 100 is turning clockwise as viewed from the left and consequently when it moves 90 degrees from the position shown in Figure 16, it will move the roller 136 to the left to the dotted line position 148. In so doing, the carriage 126 will be rotated counter-clockwise 90 degrees around the shaft 124 so that it will occupy the position shown in Figure 19.

The means for cutting the gauze and the cotton rope at the right time and the means for assembling the two all result from the operation of certain mechanism mounted on the carriage working against cams fixed on some part of the stationary frame.

Referring now to Figure 18 which is a view taken on the line 18—18 of Figure 17 the plate 130, which is complementary to the plate 128, is in the same position as the plate 128 in Figure 16. This position of the carriage 126 will be generally called the sponge assembling position of the carriage or the normal horizontal position of the carriage. Mounted on the shaft 124 is a feed roll 150 upon which rests a spool of gauze 110 which spool of gauze is rotatable around a shaft 108, the reduced ends of which as 156 are disposed between the arms of a pair of U-shaped members such as 106, see Figure 16. The gauze feed roll 150 turns freely on the shaft 124 and is in engagement with a gauze drive roll 158, see both Figures 17 and 18. The spool of gauze is so mounted that, looking at Figure 18, it will turn counter-clockwise in the direction of the arrow 160 over the feed roll 150 which moves clockwise, between the feed roll 150 and the gauze drive roll 158 onto a table 162. The outer edge 164 of the table 162 has mounted thereon a knife edge 166 which bears a fixed relationship to the carriage 126 because the table 162 is rigidly fastened thereto, that is between the rear and front carriage plates 128 and 130. The relationship of the knife 166 to the carriage 126 is shown in Figure 20.

Figure 20:
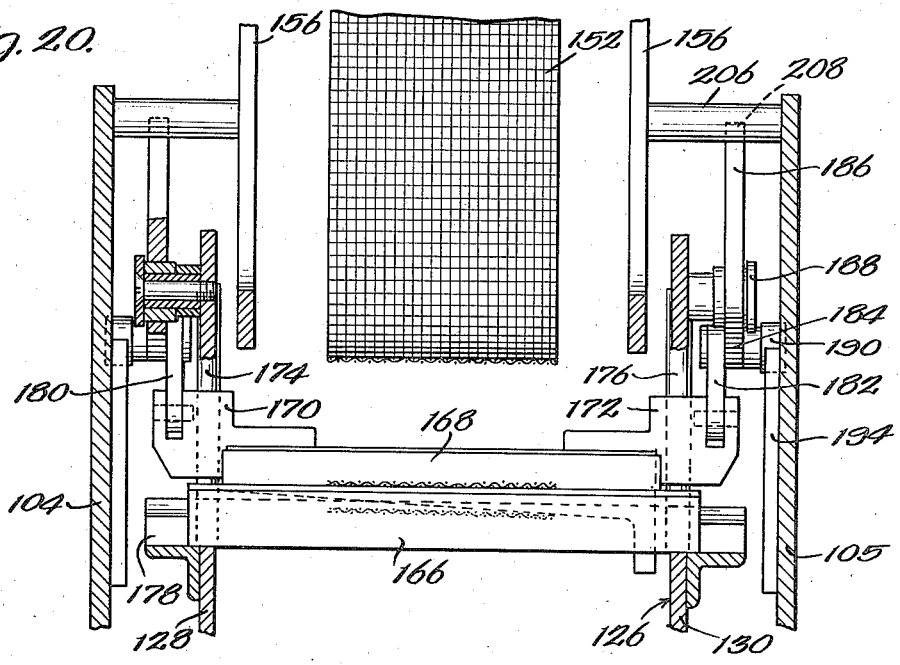
Figure 20 is taken on the line 20—20 of Figure 18.

Referring variously to Figures 18 and 20, for performing a shearing action in conjunction with the knife 166 there is provided a second knife 168 which is mounted between a pair of slides 170 and 172 movable vertically on pins 174 and 176 which are rigidly mounted in a reinforcing block 178 attached to the outer side of the fixed gauze knife 166. Pivotally mounted to each of the slides 170 and 172 are links 180 and 182.

The means for functioning the two links 180 and 182 are identical so just the link 182 will be described. The link 182 is pivotally connected at its upper end at 184 to a triangular drive bar 186 which is pivotally mounted on the supporting plate 130 of the carriage 126 by a pin 188. At the point 184 there extends outwardly a shaft carrying a cam roller 190. This roller 190 will be called the gauze feed cam roller. Referring to Figure 18, this cam roller 190 is to the left of the edge of the front supporting plate 104, this edge of that plate bearing the numeral 192, although in Figure 18 we are actually looking at the complementary plate 105. Mounted on the plate 105 and extending to the left thereof is a gauze feed cam track 194 which has a circular portion 196 drawn on an arc with the axis 124 as a center terminating at the point 198 which is slightly more than 90 degrees of arc away from the position of the roller 190 shown in Figure 18. The arc length of the curved portion of the cam 194 is perhaps 75 degrees. It is evident, therefore, that when the carriage 126 is rotated counter-clockwise as viewed in Figure 18 the roller 190 will at some point engage the straight edge 200 of the gauze feed cam plate 202. The distance of the roller 190 from the shaft 124 as seen in Figure 18 is less than the radius along which the curved surface 196 is shaped. It is immediately apparent, therefore, that the roller will move outwardly with respect to the shaft 124, pivoting around the center 184 and in so doing will draw the knife 168 away from the knife 166 providing an opening through which the gauze 204 may be fed. It will further be understood that the means for closing the knife is a positive means, namely, a lug or bar 206 which as may be seen in Figure 20 is one of the means for supporting one of the U-shaped members 156. Returning to Figure 18, the triangular drive bar 186 is provided with a finger 208 at one of its corners and when this occurs, with the carriage 126 moving clockwise, the triangular drive bar 186 will be moved counter-clockwise and pass the knife 168 across the knife edge 166 performing a shearing action because, as can be seen in Figure 20, the knife edge 168 is sloped while the knife edge 166 is horizontal.

Mounted on the carriage 126, referring to Figure 18, is a gauze positioning table 210 which receives a certain length of gauze, which is controlled by means later to be described, and supports it preparatory to an assembling operation. It should be noted that Figure 18 is a view through the center of the feed mechanism at the level of the gauze positioning table, referring to Figure 17, and returning to Figure 18, there is a slot 212 extending from the left hand side of the gauze positioning table 210 inwardly thereof, so that it is possible to pass an assembling means through the slot up through the gauze.

The means for feeding the gauze past the knives 166 and 168 which close as the carriage 126 moves clockwise back into its horizontal position originates with a gear 214, see Figure 18, pivoted on a shaft 216 mounted on the carriage 126. This shaft also carries an arm 218 which in turn carries a pawl 220 which engages the teeth of the gear 214. Also engaging the teeth of the gear 214 is a second pawl, here called a positioned pawl 222, mounted on the front plate 130 of the carriage 126. In operation when the carriage 126 moves counterclockwise, the arm 218 which had been in engagement with a block 224 mounted on the side support plate 105 moves with the carriage 126 around the shaft 124. So long as the arm 218 maintains the same relationship with the carriage 126, the gear 214 does not move. When, however, the arm 218 reaches the dotted line position 226, it engages the transverse support 228. Because the arc distance around the shaft 124 of the movement of the arm 218 from the position shown in Figure 18 to the dotted line position 226 is less than 90 degrees, and because the carriage 126 moves approximately 90 degrees, it is apparent that the arm 218 will be rotated clockwise around the shaft 216 until the carriage 126 reaches the end of its stroke. In so doing the pawl 220 will rotate the gear 214 clockwise and in rotating the gear 214 clockwise, it will rotate a gear 230 keyed to the shaft upon which the gauze drive roll is keyed in a counterclockwise direction. Consequently gauze will be fed around the feed roll 150. The gauze will not drop down between the table 162 and the roll 158 because feeding operation occurs toward the end of the movement of the carriage 126 when the two axes of the roll 150 and 158 are approaching a horizontal plane which they actually reach as shown in Figure 19. The amount of rotation of the gear 214 depends directly upon the number of degrees of arc through which the carriage 126 continues to move after movement of the arm 218 has been stopped by engagement with the transverse support 228. On the return of the carriage 126 to the position shown in Figure 18 the arm 218 would move 90 degrees of arc and hence be useless on the next cycle of the machine unless it were restored to the position shown in Figure 18. This is done by causing the arm 218 to engage the block 224. When this occurs the pawl 220 slides along the teeth of the gear 214 which, however, does not rotate or feed cloth because the pawl 222 holds it.

The block 224 is adjustably mounted on the supporting plate 105 so that it can be moved upwardly or downwardly and it is apparent that this will vary the number of degrees of arc, or the extent of the lost motion of the arm 218 which in turn will control the total number of degrees of arc through which the drive feed roll 158 will move for delivering gauze to the gauze positioning table.

The means for feeding and cutting the cotton rope are somewhat similar to the means for feeding and cutting the gauze. Referring to Figure 18, a wooden roller 232 is mounted on a shaft 234 which, referring additionally to Figure 17, is mounted on the carriage 126. A hood 236 carrying interiorly thereof funnel feeding portions 238 and 240 is likewise supported on the shaft 234. A freely rotatable pulley 242 is mounted between bracket members as 244 which are supported by the carriage member 126. A belt 246 is disposed over the wooden roller 232 and the pulley 242. Mounted on the shaft 234, see Figure 17, is a gear 248 which is in engagement with the gear 214.

Disposed to the left of the pulley 242, returning to Figure 18, is a movable cotton rope knife 250 mounted on a ram or bar 252 which is vertically reciprocable. For cooperative action with the movable cotton rope knife 250, there is a fixed knife 254, that is fixed on the carriage 126. Mounted to the left of the fixed cotton rope knife 254 is a supporting bar which extends the entire width of the carriage 126 and in which is mounted an open ended thimble 256. It is evident that the rate of feed of the gauze as compared to the rate of feed of the cotton rope will depend upon the sizes of the gears 230 and 248. Once these respective sizes are selected, referring to Figure 18, adjustment of the position of the block 224 will vary the feed of the gauze and the feed of the cotton rope not directly but proportionately. This ability to adjust by a single operation the feed of both the gauze and the cotton rope is of the utmost importance because the surgical sponges which the machine can produce may be of various sizes. There exists a commercial demand for at least two standard sizes. It is possible, therefore, to feed onto the gauze positioning table three inches of gauze and beneath the thimble 256 one inch of cotton rope to make one size of surgical sponge and/or by changing the position of the block 224, to feed four and one-half inches of gauze onto the gauze positioning table 210 and one and one-half inches of cotton rope beneath the thimble 256.

The feeding operation, referring to Figure 19, of the rope 46 and the gauze 204 occurs in the last portion of the first quarter of the cycle of the machine so that both materials are feeding downwardly with gravity.

The means for functioning the cotton rope movable knife 250 consists in, referring to Figure 18, a link 258 pivotally connected at its lower end to an arm 260 pivoted on a shaft 262 which is mounted on the carriage 126. Also mounted on the shaft 262, referring now to Figure 16, is an arm 264 which is rigidly fastened by the pin 266 to the arm 260. The arm 264 and the arm 260 therefore move as a unit somewhat in the fashion of a bell crank lever. Mounted on the arm 264 is a roller 268, see Figure 16, which may move within a closed cam track 270 through a wall of the carriage 126. The axis of the cam track 270 is an arc around the shaft 262 as a center. Mounted on the wall of one of the fixed supporting plates 104 or 105 is a cam track plate 272 having a cam edge 274 which is on an arc of a circle having the axis of the shaft 124 at its center.

In operation, referring to Figures 16 and 18, by rotating the arm 264 counter-clockwise the link 258 will be drawn downwardly and the knife 250 will recede from the knife 254 creating an opening through which the cotton rope may pass. At the beginning of the first quarters of the cycle of the machine therefore, the knives 250 and 254 will be in closed position as shown in Figure 18. During that quarter of the cycle, the carriage 126 will rotate 90 degrees. During the first 10 or 15 degrees of rotation, referring to Figure 16, the roller will engage the shoulder 278 on the plate 272 and in so doing, the arm 264 will be moved counter-clockwise with respect to the carriage 126 and will retract the knife 250 from the knife 254 until the roller reaches the end of the track 270 indicated by the dotted line position 280, in which position, the roller will clear the shoulder 278, thereby holding the arm 264 and the knife 250 in retracted or open position while the balance of the first quarter cycle of the machine is completed. During the second quarter of the cycle, the knife 250 will be held in open position until the roller which is in dotted position 280 clears the shoulder 278 at which time the arm 264 will engage a block on the frame not shown and will turn clockwise, thereby moving the knife 250 toward the knife 254.

*The assembling stage*

Referring to Figure 18, at the end of the second quarter of the cycle of the machine, a piece of cotton gauze 11 will be positioned above the thimble 256 and a section of cotton rope 13 will be positioned below the thimble 256 and all three will be positioned beneath the sponge assembling device 78 which is associated with the transfer table 74. The assembling step consists of two operations. The first operation consists in positioning a piece of cotton rope inside a swatch of gauze which is drawn downwardly and the second step consists in gathering the ends of the gauze and holding them preparatory to a stitching operation. The first step is performed by a mechanism attached to the feeding and cutting parts of the device while the second step is performed by an assembling device mounted on the table. The mechanism for positioning the cotton inside the gauze will now be described.

Referring to Figure 18 a block 282 is mounted beneath the thimble 256 in such a way that a vertical hole therethrough, 284, contains the projected axis of the open-ended thimble 256. Through this hole 284 is passed a rod or poker 286, the lower end of which is mounted on a shaft 288 carried by a pair of arms 290 and 292, see Figure 17, pivotally mounted on a cross bar 294 which constitutes part of the frame 126. The two arms 290 and 292 are connected by a shaft 296 which projects on each side of the arms 290 and 292. It is evident, referring to Figure 16, that clockwise motion of the arms 290 and 292, which are keyed to the same shaft 294 will raise the poker 286 by a selected distance.

This movement of the poker is obtained and properly timed by means of the bell crank lever 298 which is pivotally mounted at 300 on a bracket 302 mounted on the base plate 66. The upper end of the bell crank lever 298 carries a roller 304 which engages a poker drive cam track 306 mounted on shaft 100. The poker drive cam track 306 is identical to the carriage cam track 132 excepting that it is 180 degrees away from that cam track on the shaft. The lower ends as 308 of the bell crank levers 298 are slotted to form a yoke opening to receive the ends 310 and 312 of the shaft 296.

The operation of the device is as follows: Referring to Figure 16, when the carriage cam track 132 is moving the carriage 126 counter-clockwise and then clockwise 90 degrees during the first and second quarters of the cycle of the device, the poker drive cam track is holding the bell crank levers 298 and 299 in the position shown in the Figure 16 because the roller 304 is engaging that part of the cam track which is in a plane at right angles to the shaft 100. For this reason the yoke 308 permits the arm 290 to draw away therefrom and holds the yoke 308 ready to receive the end 310 of the arm 290 at the end of the second quarter of the cycle. When the end 310 is seated in the yoke 308, entering now the third and fourth quarters of the cycle of the machine, the carriage 126 is held in the horizontal position, that is the position shown in Figure 16. The roller 136 is now held in the position shown because it is engaging for 180 degrees that portion of its associated cam track which is in a plane at right angles to the shaft 100. The roller 304, on the other hand, is moving during the third and fourth quarters of the cycle from right to left and back to right and rotates the bell crank lever 298 in a counter-clockwise direction thereby causing the yoke 308 to raise the pin 310 which in turn raises the poker 286. It is apparent that the poker, referring to Figure 18, will force the portion of cotton rope through the open ended thimble up through the gauze into the opening of the assembling device 78, dependent upon the relationship of the poker drive cam track to the shaft 100. In actual practice the poker drive cam track is about 165 degrees of arc behind the carriage cam track so that the poker 286 commences its upward movement a little ahead of the end of the third quarter of the cycle of the machine.

The balance of the assembly stage will be described after the transfer table has been described.

*The transfer table*

The transfer table has been generally identified by the numeral 74. Generally speaking it comprises a plurality of independent assembling devices 78 which at the assembling station complete the second step of drawing the gauze tightly over the cotton rope leaving ends of the gauze extruded below the assembling driver. In so doing, each assembly device attains a firm grip on the sponge so that by moving the assembly device, the sponge may be brought over to a stitching stage and held in proper position.

Figure 24:
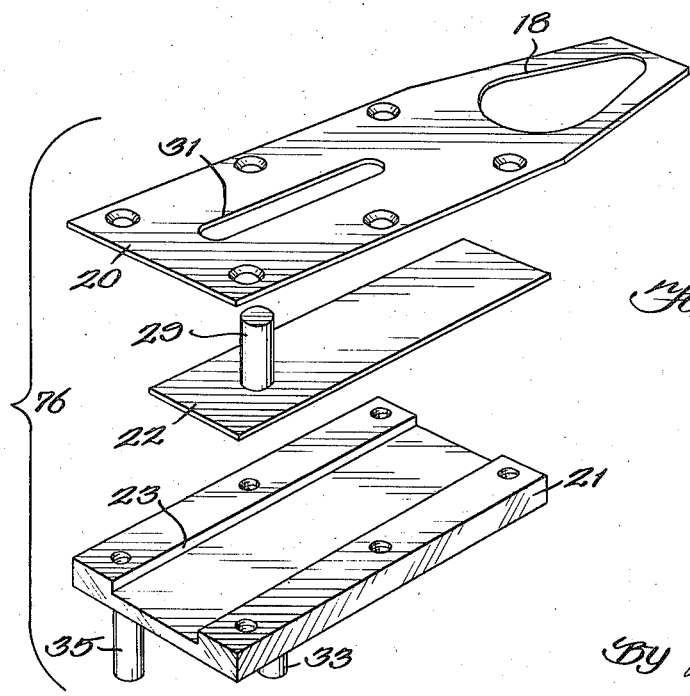
Figure 24 is an exploded view of the assembling mechanism.

One of the assembling devices is shown in perspective in Figure 24. In describing it, the same numerals will be used as were used in describing the method in connection with Figures 4 to 7. The upper plate 20 is made of thin flexible metal and has therein an opening 18 which is smaller at the outer end of the plate than at the other end of the plate. Beneath the plate 20 and spaced therefrom is a substantially rigid member 21, the spacing between the two being maintained by means of rivets or screws. The heavy member 21 has a channel 23 in its upper surface in which may slide a gripping or pinching plate 22. Mounted on the upper side of the plate 22 is a post 29 which is positioned in a slot 31 in the plate 20 and projects to a point substantially above the plate 20. Depending from the inner side of the member 21 are a pair of guide posts, one short, 33 and one long, 35.

In order to form a surgical dressing and carry it over to the stitching stage, the transfer table must perform the following functions: firstly, it must hold a sponge assembling device 76, see Figure 21, at the assembling station for a substantial portion of the third and fourth quarters of the stroke of the machine so that the poker may function; secondly, it must move the post 29 and thereby the thin plate 22 to the right as shown in Figure 24 so as to squeeze the ends of the gauze into the small end of the opening 18 while the assembling device remains at the assembling station; thirdly, it must move each assembling device from the assembling station to the stitching station while holding the plate 22 in its right-hand position so that the surgical sponge does not get free; and fourthly, at the end of the stitching operation, the transfer table must move the plate 22 back to the position shown in Figure 24 so as to release the surgical sponge and position the assembling device for a second use in the assembling station.

Referring to Figure 14, a shaft 314 is driven by a chain 315 from the main drive shaft 100 and in turn through the beveled gears 316 drives a vertically disposed shaft 318 which passes upwardly through the transfer table generally identified by the numeral 74. As seen in Figure 14, the transfer table appears to be built of a lower deck 320 upon which rests a plurality of assembling devices such as 76 which in turn are held down by a top deck 322. The lower deck, referring to Figure 22, comprises an island 324 having semi-circular ends surrounded by a plate 326, the two being spaced from each other so as to form a closed track 330 in which may move both the long lug 35 and the short lug 33 depending from the assembling device 76. The island 324 and the plate 326 are maintained in proper spaced relationship by means of a pair of end supports. Referring to Figure 22, a plate 327 is mounted on one end of the plate 326 and a U-shaped plate 329 is mounted on the other end. A pair of posts 331 and 333 are disposed on the upper side of plate 327 and a pair of posts 335 and 337 are disposed upon the upper side of plate 329. Referring to Figures 14 and 21, supported on the upper ends of the posts 335 and 337 is a triangular plate 339 from the inner corner of which depends a post 341 which is fastened to the upper deck 322 and island 324. A plate 343 is similarly mounted on the other plate 327. The posts 331, 333, 335 and 337 are positioned at a sufficient distance from the cam track 330 to permit the assembling devices to move around the track without engaging said posts.

Referring to Figure 22, the straight side of the track 330 adjacent to the stitching station 80 has a capacity of five assembling devices side by side. Provision is also made for one assembling device at the assembling station 78 and another assembling device moving toward that station and another one moving away from that station. These assembly devices 15 are dropped into the track 330 and the long depending post 35 occupies the position shown in Figure 14. Mounted on and keyed to the shaft 318 is a cross arm 332. By rotating 180 degrees, the cross arm 332 will engage the long depending lug 35 of that assembling device 15 nearest to itself and move it around to the other side of the table.

A similar cross arm 334 is mounted beneath the other end of the table and performs the same function in carrying the assembling devices around that end of the table. This cross arm 334 is mounted on a shaft 336. This shaft 336 carries a sprocket 338 at its upper end as does the vertical shaft 318. Referring to Figure 21, this sprocket carries numeral 337 and drives by a chain 342 the shaft 336.

Figure 23:
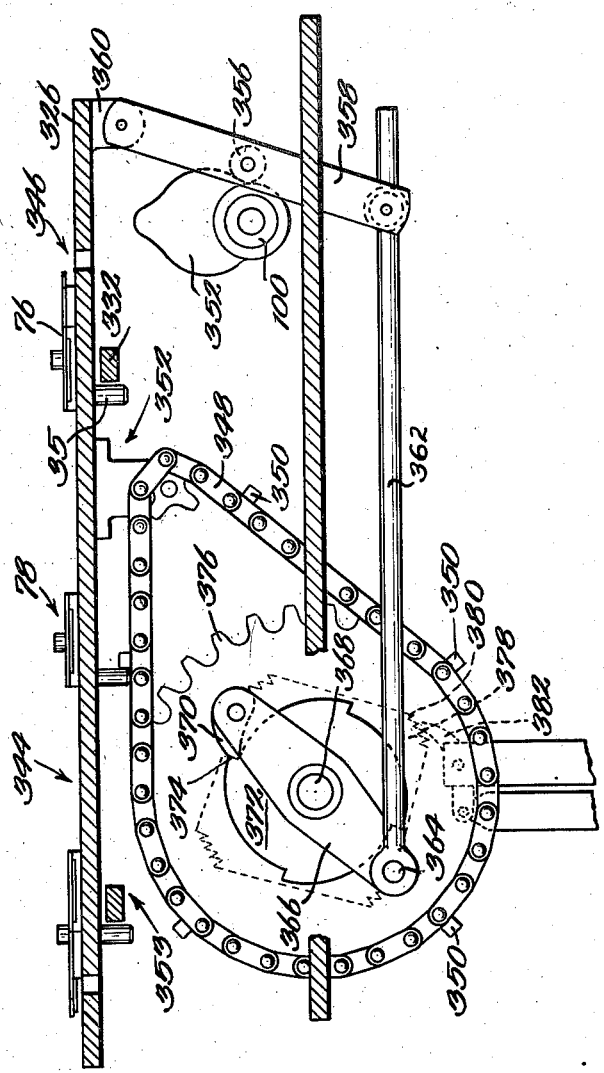
Figure 23 is a view taken on the line 23—23 of Figure 14.

The mechanism for moving the assembling devices along the long sides of the table are independent. The device performing this function on the side of the transfer table adjacent to the assembling station 78 is shown in Figure 23 where the straight side of the table extends from about the point 344 to about the point 346. Disposed beneath the table is a chain and beneath that side of the track 330 adjacent to the assembling station is a chain 348 having thereon a plurality of spaced cleats 350. Because the chain is directly beneath the portion 352 (see Figure 22) of the track 330 at a level immediately below the bottom of the long depending lugs 35 on each assemblage device 15 it will move that assemblage device along the track. Inasmuch as the cross-arm 332, Figure 22, will move one assemblage device 15 from the last position in the stitching station to a ready position 352 on the table once for each complete cycle of the machine, it is necessary for the equipment shown in Figure 23 to move an assembling device from position 352 to assembling position 78 for each cycle of the device.

Continuing to refer to Figure 23, disposed on the main drive shaft 100 is a cam 352 the surface of which engages a roller 356 mounted between a pair of arms 358 and 360, see also Figure 14 which are pivoted at the upper end to a bracket 360 mounted on plate 326. Pivotally connected to the lower end of the two arms 358 and 360 is a link 362 which has its other end pivotally connected to a stud 364 mounted on an arm 366 mounted on a shaft 368. The shaft is mounted on the frame of the machine. The other end of the arm 366 carries a pawl 370 which is disposed in the same vertical plane as a disc 372 having on its circumferential surface four shoulders such as 374, said shoulders being spaced 90 degrees apart and presenting their surface to the pawl 370. When the main drive shaft 100 rotates clockwise one complete revolution, the cam 352 engaging the roller 356 will swing the arms 358 and 360 to the right. In so doing, the disc 372 will be moved 90 degrees. Inasmuch as the disc 372 is keyed to the shaft 368 and inasmuch as the large gear wheel 376 is also keyed to the shaft 368, the chain will be moved by a distance equal to the length required to cover one quarter of the circumferential surface of the gear 376. The relationship of the arm 332 to one of the cleats or lugs 350 is such that just as the arm 332 is about to clear a post 35 depending from an assembling device 76, the cleat 350 will engage the post and move it from the position 352 into the assembling station 78.

Behind the gear 376, continuing to refer to Figure 23, is a plate 378, having the shape of a parallelogram with a plurality of teeth 380 at each corner. Engageable with said teeth is a pawl 382 which is mounted on any portion of the frame. The plate 378 is keyed to the shaft 368 and exists solely for the purpose of preventing the shaft from moving clockwise after it has been turned 90 degrees counter-clockwise by the arm 366.

It is apparent from the foregoing, referring to both Figures 22 and 23, that the movements of the arms 332 and 334 and of the chain 348 are such that the arm 334 feeds an assembling device up to position 352 just as a cleat 350 on the chain 348 is ready to pick it up and during one cycle of the machine quickly move it into the assembling position 78. This movement of an assembling device from position 352 into the assembling station 78 and of another assembling device from the assembling station 78 over to position 353 is effected during the first quarter of a cycle of the machine. It will be appreciated that this operation would be effected at any time during the first and second quarters.

Completing the description of the movement of the assembling devices around the table, and referring to Figure 22, the assembling devices are moved down the straight portion of the track adjacent to the stitching station 80 at a rate of speed such that an assembling device covers a little more than its own width during one cycle of the machine. The means for effecting this movement is a chain 384, see Figure 14, which carries a plurality of spaced cleats and which moves at the requisite speed. These cleats engage the depending posts 35 of the assembling devices in the same manner as do the cleats on the chain 348 in Figure 23. The chain 384 has its upper side extending the full length of the straight side of the cam track 330 adjacent the stitching station 80, see Figure 22. It is not thought necessary to show any detail on this chain.

Having described the means of moving the assembling devices 76 around the closed cam track 330, I will now describe the means of opening and closing the plate 22 in each assembling device. Referring to Figure 21, disposed above the level of the assembling device 76 are a pair of cam tracks 386 and 388. These two cam tracks consist of flat plates and are held in assembled relationship by means of posts such as 341 and a bridging plate 390. The cam track plate 386 has a cam engaging surface which commences at the point 392 and continues to the point 394. The cam track plate 388 has a cam track surface which engages at about 396 and terminates at the point 398. Cam track surfaces of both plates 386 and 388 are in a plane which is intercepted by the upwardly directed posts 29 on the pinching plate 22 of each of the assembling devices. This is clearly shown in Figure 14 where the cam track plate 388 may be seen with a pair of posts 29 shown in dotted outline. The cam track surface 386 between the points 392 and 394 is at a uniform distance outwardly of the cam track 30. Expressed differently, the cam track portion between the points 392 and 394, refer to Figure 21, follows a path defined by the movement of the outer end of the slot 31 of any one of the assembling devices from the point 392 over to the point 394. Inasmuch as the post 29 is in the plane of this cam track, it follows that the pinching plate 22 will be held in closed position between the points 392 and 394.

The cam track surface of the plate 388 follows a curve which will move a post 29 inwardly toward the main cam track 330, that is toward the inner edge of the slot 31 in the upper plate 20, see Figure 24. By the time that the assembling device has reached position 346, referring to Figure 21, a post 29 will have retracted the pinching plate 22 so that the ovate opening 18 will be fully uncovered and ready for the assembling operation.

It will be appreciated that the pinching plate 22 must be moved into closed position fairly rapidly as the poker is withdrawn from the temporarily assembled surgical sponge shown at 78. This is accomplished by the arm 400 which is pivotally mounted at 402 on the plate 386 and carries a pair of rollers 404 and 406 disposed in separate planes. The roller 404 engages a double fingered disc 408 while the roller 406 engages a disc 410 having therein a pair of notches 412 and 414. The fingers on the disc are numbered 416 and 418 respectively.

The functioning of this mechanism is quite simple. Just after the positioning of a surgical sponge in the assembling device at the assembling station 78, the disc 408, which is rotating counter-clockwise on the shaft 336 engages the roller 404 which thereby rotates the arm 400 counter-clockwise. The projecting end 420 of arm 400 engages the post 29 of the assembling device that happens to be in the assembling station 78 and moves it outwardly into dotted line position 422, thereby pinching the surgical sponge into the small end of the ovate opening 18 and holding it tightly so that it may be moved around the transfer table past the cutting knives and stitcher. When the post 29 is in the dotted line position 422, the assembling device may not be moved forwardly because of the shoulder portion 424 which prevents such movement and protects the poker from any untoward forward movement of the assembling device. The roller 406 on the arm 400 will have entered the notch 414 and as the roller 404 clears the finger 16, the roller 406 will engage the surface 426 and thereby cam the arm 400 clockwise so as to clear the post 29. As the roller 406 commences its movement, a cleat on the chain 348, see Figure 23, commences to move the assembling device out of the assembling station 78 into the position 353. Shortly before reaching the position 353, the post 29 in position 422 will engage the cam track plate 386 at the point 392 and will be held in closed position. This will continue all the way around table until after the completion of the stitching and cutting operations at which time the post 29 will leave the cam track surface of plate 386 at point 394 and continuing its movement around the table will engage the inner surface of the cam track plate 388 at about the point 396 and will slowly be cammed inwardly so as to fully open the ovate opening by the time that the assembling device reaches position 346. The process is then repeated.

Figure 15:
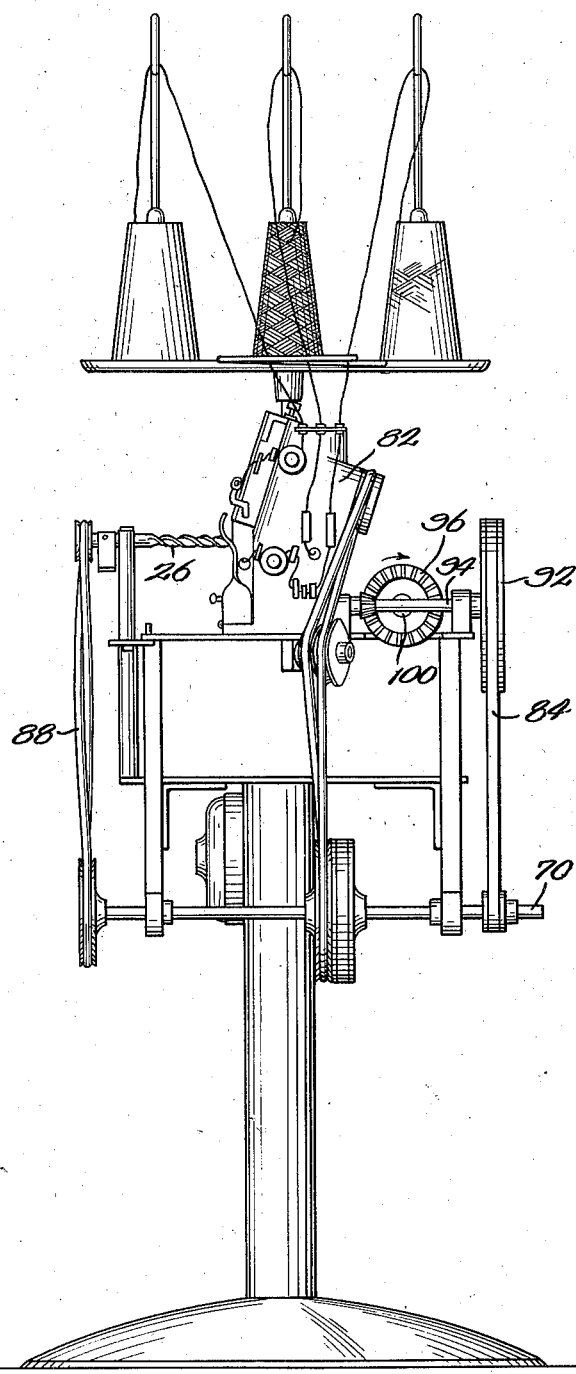
Figure 15 is an end view in elevation taken from the right side of Figure 13.

As for the stitching and cutting stages, continuing to refer to Figure 21, as each surgical sponge passes over a plate arm 428 beneath a guide wire 430, the conjoint action of which is to compress the tails of the sponge into a single plane, they are slowly flattened out until they are quite flat on the plate 432. The ends of the tails are caught by the rotating worm 26, which is mounted as shown in Figure 15 and which is driven by the belt 88. The worm catches the tails of the sponges between itself and the plate 43 and tends to gather them together between one of its grooves. The end of the worm 26 is just short of a cutting knife 434 which is only schematically shown because it is mounted on a standard sewing machine and has an up and down movement corresponding to the movements of the needle of the sewing machine. This knife 434 severs the tails from the sponges at a short distance from the edge 436 of each of the assembling devices. This edge may be called the stitching edge of each assembling device. The severed tails are removed by means of suction through the pipe 438. Operating at the point 440 is the needle of the sewing machine which bears the numeral 82 and it may be seen in either Figure 13 or Figure 15. This needle is making a continuous stitch and the stitch is a buttonhole stitch around the cut portions of the sponges. It is necessary to remove that portion of the stitches between adjacent sponges and this is done by means of a pair of movable knives 442 and 444 working against a pair of fixed knives 446 and 448. Continuing to refer to Figure 21, an arm 450 supports a sleeve 452 to which is fastened, referring to Figure 25, the fixed knives 448 and 446. Disposed in the sleeve is a shaft 454 having a suqare end portion 456 over which is mounted a sleeve 458 to which is fastened the two movable knives 442 and 444. Referring to Figure 26, the fixed knives 446 and 448 have their cutting edges at the point 460 and this is so disposed that the stitched ends of the surgical sponges will pass beneath the edge 460 above the cutting edge of the movable knife 444. The two knives 442 and 444 are spaced by a distance sufficient to clip just that portion of the continuous stitch which does not engage the protruding portion of the surgical sponge.

The means for functioning the movable knives 442 and 444 are illustrated in Figures 25 and 14. Mounted at the end of the shaft 454 is a short arm 462 having at its other end a stud 464 which rides in a track 466 in a vertically reciprocable member 468. This member is drawn downwardly by a spring 470. On a bracket 472 on the member 468 is mounted a member 474 which is pivoted at 476 to a post 478 mounted on the frame. This member 474 has a finger 480 which rides the circumferential surface of a disc 482 mounted on the main drive shaft 100 and has a short deep notch 484. When the finger 480 encounters the notch 484 it drops into it thereby permitting the string 486 to snap the member 468 downwardly, which in turn, referring to Figure 14, rotates the shaft 454 counter-clockwise and causes the movable knives to pass over the surfaces of the fixed knives. Because of the comparatively short arc dimension of the notch 484, referring again to Figure 25, the finger 480 is quickly cammed back to the circumferential surface of the disc 482 so that the cutting action of the knives 442 and 444 occurs in a comparatively short period of time. Returning to Figure 14, the excess stitching is removed by suction through the tube 486.

Having thus described my invention, what I wish to claim as new and secure by Letters Patent of the United States is:

1. The method of making a surgical sponge which comprises the steps of positioning a casing swatch adjacent an opening in a formative member, positioning an absorbent, compressible core having a size slightly greater than said opening adjacent the casing swatch in alignment with said opening, compressing the absorbent core by forcing it against the casing swatch and through the opening leaving the edges or tails of the casing swatch on the positioning side of the formative member, and then stitching the protruding tails of the casing swatch on the positioning side to form a surgical sponge.

2. The method of making a surgical sponge which comprises the steps of positioning a swatch of gauze between a pair of aligned encircling means, shaping an absorbent compressible core of a size slightly exceeding the opening in the encircling means by forcing it through the first encircling means against the gauze swatch, pushing the shaped absorbent core and the gauze engaged thereby through the second encircling means, withdrawing the pushing means whereby the tails of the gauze extending through the encircling means hold the core adjacent thereto, directing said tails in a single direction, and stitching the tails together.

3. The method of making a surgical sponge which comprises feeding downwardly a section of gauze casing and a section of cotton rope so that one is on each side of a ring member whose axis is substantially horizontally disposed, maintaining this relationship while moving the ring so that its axis is in a substantially vertical position with the section of gauze on top and the section of cotton rope beneath, positioning said gauze ring and rope in alignment with an opening in a plate positioned adjacent to the gauze, forcing the section of cotton rope through the ring and picking up the gauze through the opening in the plate sufficiently far so that the section of cotton rope is beyond the plate while the tails of the gauze remain below the plate, and stitching the tails of the gauze.

4. The method of making a surgical sponge which comprises feeding downwardly the end of a roll of gauze and the end of a cotton rope so that one is on each side of a ring member whose axis is substantially horizontally disposed, maintaining this relationship while moving the ring so that its axis is in a substantially vertical position with a portion of the gauze on top and a portion of the cotton rope beneath, severing the portions of gauze and cotton rope adjacent the ring from the gauze roll and cotton rope respectively, positioning a plate having an opening therein above the gauze in alignment with the ring member, forcing the section of cotton rope through the ring member against the gauze and on through the opening in the plate sufficiently far so that the section of cotton rope is above the plate while the tails of the gauze remain below the plate, and stitching the tails of the gauze.

5. The method of making a surgical sponge which comprises feeding downwardly the end of a roll of gauze and the end of a cotton rope so that one is on each side of a ring member whose axis is substantially horizontally disposed, maintaining this relationship while moving the ring so that its axis is in a substantially vertical position with a portion of the gauze on top and a portion of the cotton rope beneath, severing the portions of gauze and cotton rope adjacent the ring from the gauze roll and cotton rope respectively, positioning a plate having an opening therein above the gauze in alignment with the ring member, forcing the section of cotton rope through the ring member against the gauze and on through the opening in the plate sufficiently far so that the section of cotton rope is above the plate while the tails of the gauze remain below the plate, pinching the tails of the gauze in the opening in the plate while directing them in a single direction, and stitching the tails of the gauze together along a substantially straight line.

6. The method of making a surgical sponge which comprises feeding downwardly the end of a roll of gauze and the end of a cotton rope so that one is on each side of a ring member whose axis is substantially horizontally disposed, maintaining this relationship while moving the ring so that its axis is in a substantially vertical position with a portion of the gauze on top and a portion of the cotton rope beneath, severing the portions of gauze and cotton rope adjacent the ring from the gauze roll and cotton rope respectively, positioning a plate having an opening therein above the gauze in alignment with the ring member, forcing the section of cotton rope through the ring member against the gauze and on through the opening in the plate sufficiently far so that the section of cotton rope is above the plate while the tails of the gauze remain below the plate, pinching the tails of the gauze in the opening in the plate while directing them in a single direction, compressing the tails of the gauze so that they may be fed into a sewing machine, cutting the tails fairly close to the opening in the plate, and stitching with a buttonhole stitch the cut ends of the surgical sponge.

7. The method of making a surgical sponge which comprises feeding downwardly a section of gauze casing and a section of cotton rope so that one is on each side of a ring member whose axis is substantially horizontally disposed, maintaining this relationship while moving the ring so that its axis is in a substantially vertical position with the section of gauze on top and the section of cotton rope beneath, positioning said gauze ring and rope in alignment with an opening in a plate positioned adjacent to the gauze, forcing the section of cotton rope through the ring and picking up the gauze through the opening in the plate sufficiently far so that the section of cotton rope is beyond the plate while the tails of the gauze remain below the plate, pinching the tails of the gauze at the opening of the plate and directing them in a single direction, limiting the width of the tails and compressing them into a flat mass, severing the excess parts of the tails along a straight line in advance of a stitching needle, causing the stitching needle to make a buttonhole stitch over the cut edges of the tails still attached to the surgical sponge, causing the stitching needle to make a continuous stitch regardless of whether it is stitching the tails or idling, and cutting off those portions of the stitch not engaging any portion of the cut tails of a surgical sponge.

8. A surgical sponge making machine comprising a frame, means on the frame for partly compressing a compressible core member while concurrently wrapping a cloth swatch therearound so that excess portions of the swatch may be gathered together at one side, means for pinching said excess portions tightly together at a point adjacent to the core member, and means for stitching together said excess portions near the pinching point.

9. A surgical sponge making machine comprising a frame, means on the frame for partly compressing a compressible core member within a cloth swatch and for holding the core member so compressed by the cloth swatch so that excess portions of the swatch may be gathered together at one side, means for moving toward each other a pair of walls engaging the opposite sides of said excess portions of the swatch at a point close to the core member, and means for binding together said excess portions near the point of engagement of said two walls.

10. A surgical sponge making machine comprising a frame, means on the frame defining an opening, means for positioning a cloth swatch adjacent said opening, means for forming a compressible core member of a size slightly larger than said opening, means for positioning said core member adjacent the cloth swatch in alignment with said opening, means engageable with the core member for forcing it and the swatch through the opening sufficiently far so that the core member encased in cloth will be on one side of the opening while excess portions of the swatch will be on the other side, means for withdrawing said forcing means, means for pinching together the excess portions of the swatch at the opening, and means for stitching together said excess portions at a point near to the opening.

11. A surgical sponge making machine comprising a frame, a plate having a restricted opening mounted on said frame, a second plate movable adjacent to the surface of the first plate so that one of its edges may reduce the size of said opening, means for forming a compressible core member of a size slightly larger than said opening, means for positioning a cloth swatch and said core member adjacent said opening on the side of the second plate, means engageable with the core member for forcing it and the swatch through the opening sufficiently far so that the core member encased in cloth will be on one side of the opening while excess portions of the swatch will be on the other side, means for moving the second plate into engagement with the excess portions of the swatch so as to hold them tightly against one wall of the opening, and means for stitching together said excess portions at a point near said opening.

12. A surgical sponge making machine comprising a frame, a plate having an ovate opening therein mounted on said frame, a second plate movable along the surface of the first plate in such a way that one of its edges will move from the large side of the ovate opening toward the small side so as to close the same, means for positioning a core member wrapped in a swatch of cloth in such a way with respect to the opening that the core member encased in cloth is on one side thereof and excess tail portions of the swatch extend through to the other side of said opening, means for moving the second plate so that it pinches the excess portions of the swatch between one of its edges and the small end of the ovate opening, and means for stitching together said excess portions at a point near said opening.

13. A surgical sponge making machine comprising a frame, a plate having an opening small at one side and larger at the other, a second plate movable adjacent to the surface of the first plate in such a way that it will cover the large end of the opening first while moving toward the small end, means for positioning a core member encased in a swatch of cloth in such a way with respect to the opening that the cloth covered core member is on one side thereof while excess tail portions of the swatch extend through the opening, means for moving the second plate so that it not only pinches the excess portions of the swatch between one of its edges and the small end of the opening, but also sufficiently far to direct the excess portions of the swatch somewhat parallel to the surface of the plates, and stitching means adjacent the first plate for binding together said excess portions of the swatch.

14. A surgical sponge making machine comprising a frame, a plate having a stitching edge and spaced therefrom so that its major axis is at substantially right angles thereto an ovate opening with the small end adjacent the stitching edge, a second plate reciprocable along the major axis of the ovate opening and adjacent to one surface of the first plate, means for positioning a core member wrapped in a swatch of cloth in such a way with respect to the ovate opening that the covered center is on that side of the first plate opposite to the surface engaged by the second plate while the excess tail portions of the swatch extend through the opening, means for moving the second plate toward the stitching edge so that it gathers the excess portions of the swatch at the small end of the ovate opening and directs them toward the stitching edge, means for moving both plates near to a third plate which supports the excess portions of the swatch, and means for stitching together the excess portions of the swatch along the stitching edge of the plate.

15. A surgical sponge making machine comprising a frame, a plate having a stitching edge and spaced therefrom so that its major axis is at substantially right angles thereto an ovate opening with the small end adjacent the stitching edge, a second plate reciprocable along the major axis of the ovate opening and adjacent to one surface of the first plate, means for positioning a core member wrapped in a swatch of cloth in such way with respect to the ovate opening that the covered center is on that side of the first plate opposite to the surface engaged by the second plate while the excess tail portions of the swatch extend through the opening, means for moving the second plate toward the stitching edge so that it gathers the excess portions of the swatch at the small end of the ovate opening and directs them toward the stitching edge, means for moving both plates near to a third plate which supports the excess portions of the swatch, rotating means for drawing the free ends of the excess portions of the swatch between itself and said third plate whereby the excess portions of the swatch are drawn tightly adjacent the stitching edge of the plate, and means for stitching together the excess portions of the swatch along the stitching edge of the plate.

16. A surgical sponge making machine comprising a frame, a plate having a stitching edge and spaced therefrom so that its major axis is at substantially right angles thereto an ovate opening with the small end adjacent the stitching edge, a second plate reciprocable along the major axis of the ovate opening and adjacent to one surface of the first plate, means for positioning a core member wrapped in a swatch of cloth in such a way with respect to the ovate opening that the covered center is on that side of the first plate opposite to the surface engaged by the second plate while the excess tail portions of the swatch extend through the opening, means for moving the second plate toward the stitching edge so that it gathers the excess portions of the swatch at the small end of the ovate opening and directs them toward the stitching edge, means for moving both plates near to a third plate which supports the excess portions of the swatch, a worm positioned substantially parallel to the stitching edge of the first plate and spaced therefrom and close to the third plate and so turning that it draws the excess portion of each swatch between itself and the third plate and tends to gather all of the excess portions of each swatch within one of its grooves so as to make the width of the excess portions of the swatch fairly uniform for a stitching step, a needle making a continuous stitch at a selected distance from the stitching edge of the first plate, and a cutter for severing that portion of the stitch which does not engage excess portions of each swatch.

17. A surgical sponge making machine comprising a frame, a plate having a stitching edge and spaced therefrom so that its major axis is at substantially right angles thereto an ovate opening with the small end adjacent the stitching edge, a second plate reciprocable along the major axis of the ovate opening and adjacent to one surface of the first plate, means for positioning a core member wrapped in a swatch of cloth in such a way with respect to the ovate opening that the covered center is on that side of the first plate opposite to the surface engaged by the second plate while the excess tail portions of the swatch extend through the opening, means for moving the second plate toward the stitching edge so that it gathers the excess portions of the swatch at the small end of the ovate opening and directs them toward the stitching edge, means for moving both plates near to a third plate which supports the excess portions of the swatch, rotating means for drawing the free ends of the excess portions of the swatch between itself and said third plate whereby the excess portions of the swatch are drawn tightly adjacent the stitching edge of the plate, means for cutting the excess portions of the swatch at a selected distance from the plate's stitching edge, and means for making a buttonhole stitch across the cut ends of the surgical sponge.

18. A surgical sponge making machine comprising a frame, a plate having a stitching edge and spaced therefrom so that its major axis is at substantially right angles thereto an ovate opening with the small end adjacent the stitching edge, a second plate reciprocable along the major axis of the ovate opening and adjacent to one surface of the first plate, means for positioning a core member wrapped in a swatch of cloth in such a way with respect to the ovate opening that the covered center is on that side of the first plate opposite to the surface engaged by the second plate while the excess tail portions of the swatch extend through the opening, means for moving the second plate toward the stitching edge so that it gathers the excess portions of the swatch at the small end of the ovate opening and directs them toward the stitching edge, means for moving both plates near to a third plate which supports the excess portions of the swatch, rotating means for drawing the free ends of the excess portions of the swatch between itself and said third plate whereby the excess portions of the swatch are drawn tightly adjacent the stitching edge of the plate, means for cutting the excess portions of the swatch at a selected distance from the plate's stitching edge, and means for stitching together the cut ends of the excess portions of the swatch at a selected distance from the stitching edge of the plate.

19. A surgical sponge making machine comprising a frame, a plurality of sponge assembling and holding devices each comprising a holding plate having an ovate opening therethrough with its major axis normal to a stitching edge of said plate and with the small end of the ovate opening toward said stitching edge, a gripping plate reciprocable along the axis of the ovate opening so as to pinch therein the excess portions of a swatch of cloth wrapped around a core member so as to direct those excess portions past the stitching edge of the first plate, means for successively loading each sponge assembly and holding device, means for moving and accumulating several of such devices at a stitching station so that their stitching edges are in alignment and may be moved past a cutter and a needle, a cutter for severing the excess portions of each swatch at a selected distance from the stitching edge of each plate, a needle making a continuous stitch through the excess portions of each swatch and between the swatches, and a second cutter severing that portion of the stitches between the stitched portions of each sponge.

20. A surgical sponge making machine comprising a frame, a plurality of sponge assembling and holding devices each comprising a holding plate having an ovate opening therethrough with its major axis normal to a stitching edge of said plate and with the small end of the ovate opening toward said stitching edge, a gripping plate reciprocable along the axis of the ovate opening so as to pinch therein the excess portions of a swatch of cloth wrapped around a core member so as to direct those excess portions past the stitching edge of the first plate, means for successively loading each sponge assembling and holding device, means for moving and accumulating several of such devices at a stitching station so that their stitching edges are in alignment and may be moved past a cutter and a needle, a worm positioned substantially parallel to the aligned stitching edges of said first plates and in such relationship to a third plate that its rotation will draw the excess portions of each swatch between itself and the third plate and will tend to gather all of the excess portions of each swatch within one of its grooves so as to render uniform the width of the excess portions of the swatch preparatory to a stitching step, a needle making a continuous stitch at a selected distance from the stitching edges of the first plate of each holding device behind the cutter, and a pair of spaced knives for severing that portion of the stitch between stitched portions of each sponge.

21. A surgical sponge making machine comprising a frame, means on the frame defining an opening, means for positioning a cloth swatch adjacent said opening, means for forming a compressible core member of a size slightly larger than said opening, means for positioning a compressible core member adjacent the cloth swatch in alignment with said opening, means engageable with the core member for forcing it and the swatch through the opening sufficiently far so that the core member encased in cloth will be on one side of the opening while excess portions of the swatch will be on the other side, means for withdrawing said forcing means, means for pinching together the excess portions of the swatch at the opening, means for stitching together said excess portions at a point near to the opening, and means for withdrawing said pinching means so as to release the surgical sponge and for tumbling the surgical sponge from the restricted opening.

22. A surgical sponge making machine comprising a frame, a plurality of assembled sponge holding devices movably disposed on said frame, means for successively positioning said devices at an assembling station, means at the assembling station for positioning in one of said holding devices a core member having a cloth swatch thereabout with its excess portions extending beyond a selected side of the holding device, a cutting and stitching station, means on the frame for moving each holding device from the assembling station to the cutting and stitching station, sewing and cutting means at the stitching station, and means for accumulating a plurality of holding devices at the stitching station so that the stitching may proceed continuously unaffected by the intermittent character of the movement of the holding devices at the assembling station.

23. A surgical sponge making machine comprising a frame, a transfer table mounted on said frame, a closed cam track on said table, a surgical sponge assembling station adjacent one part of said track and a cutting and stitching station adjacent another part of said track, a sponge holding member having guide means engageable with said track and having an ovate opening in its outer end with the small end of the opening outwardly directed, a plate reciprocable along the major axis of the ovate opening for closing the same, means at the assembling station for moving said plate into closed position, means for holding it in closed position while other means are moving the sponge holding member to the cutting and stitching station, and means for returning said plate to open position after the sponge holding member has passed through the cutting and stitching station.

24. A surgical sponge making machine comprising a frame, a transfer table mounted thereon, a closed cam track opening through said table forming an island therein, a sponge holding member resting on the table and having depending guide means engageable with said cam track for holding the sponge holding member in fixed lateral position with respect to the cam track, an ovate opening in that side of the sponge holding member on the outside of the cam track, said ovate opening having its small end pointed outwardly, a plate adjacent the sponge holding member and reciprocable along the axis of the ovate opening, an upright stud on said reciprocable plate, means for moving the sponge holding member around the track, an assembling station and a cutting and stitching station adjacent the cam track, means at the assembling station engageable with said stud for moving the plate so as to close the ovate opening in the sponge holding member, a cam track positioned at the level of said stud for holding the reciprocable plate in closed position while the sponge holding member is being moved from the assembling station to the cutting and stitching station, and a second cam track engageable with said stud returning the reciprocable plate to open position while the sponge holding member is being moved back to the assembling station.

25. A surgical sponge making machine comprising a frame, a table having a peripheral edge mounted on said frame, a second table disposed in the same plane as the first table and having an inner edge uniformly spaced from the peripheral edge of the first table to form a closed track, a plurality of sponge holding members each comprising an elongated member having a pair of depending lugs at its inner end for positioning in said track, an ovate opening in its outer end with the small end thereof toward the outer end and a plate reciprocable along the major axis of the ovate opening whereby to close the same, an assembling station adjacent the cam track, a cutting and stitching station spaced therefrom, and means beneath the table engaging one of the depending lugs for moving each holding device quickly into the assembling station, for holding the same therefor a selected period of time, and quickly out of the assembling station, and other means for moving each holding device to and thereafter at a substantially constant speed through the cutting and stitching station.

26. A surgical sponge making machine comprising a frame, a table having a peripheral edge mounted on said frame, a second table disposed in the same plane as the first table and having an inner edge uniformly spaced from the peripheral edge of the first table to form a closed track, a plurality of sponge holding members each comprising an elongated member having a pair of depending lugs at its inner end for positioning in said track, an ovate opening in its outer end with the small end thereof toward the outer end and a plate reciprocable along the major axis of the ovate opening whereby to close the same, an upwardly directed lug mounted on the reciprocable plate, an assembling station adjacent the cam track, a cutting and stitching station spaced therefrom, means engageable with one of the depending lugs for moving each sponge holding member from the assembling station to the cutting and stitching station, and a cam track between the assembling station and the cutting and stitching station in alignment with the upwardly directed lug on the reciprocable plate and having a contour such that it will hold the reciprocable plate in closed position over the ovate opening during movement from the assembling station to the cutting and stitching station.

27. A surgical sponge making machine comprising a frame, a transfer table mounted thereon, a closed cam track opening through said table forming an island therein, a plurality of sponge holding devices each comprising an elongated base plate having one short and one long lug depending from one side thereof for positioning in said cam track, the other end of the base plate being directed away from the table, a holding plate mounted on the base plate and having in its outer end an ovate opening therethrough with its major axis normal to a stitching edge along the outer end of said plate and with the small end of the ovate opening toward said stitching edge, a gripping plate reciprocable along the axis of the ovate opening so as to close said opening, an assembling station adjacent one side of said cam track, a cutting and stitching station adjacent another side of said cam track, drive means for moving a holding device along the track positioned beneath that portion of the cam track adjacent to the assembling station, and means for causing the drive means to move a sponge holding device into the assembling station, hold it there during an assembling operation and moving it out of the assembling station while other means are moving another holding device through the cutting and stitching station.

28. A surgical sponge making machine comprising a frame, a transfer table mounted thereon, a pair of substantially parallel cam track openings joined at their ends by semi-circular cam track openings to form a continuous cam track, a plurality of sponge holding devices each comprising a base member having one short and one long lug depending from the inner side thereof for positioning in said cam track, in the other end of said sponge holding device an ovate opening having its small end adjacent to the outer end or stitching edge of said base member, a gripping plate reciprocable along the axis of the ovate opening so as to open or close the same, an assembling station adjacent one of the straight portions of the cam track, a cutting and stitching station adjacent the other straight portion of the cam track, a chain carrying cleats positioned beneath the first mentioned straight portion of the cam track, means for moving said chain by the distance between the assembling station and the end of the straight portion of the track in a length of time comparatively short once for each cycle of the machine, an arm rotatable in a plane containing the depending lugs of the sponge holding devices at the center of each of the curved ends of the cam track, means for rotating said arm so as to pick up a sponge holding device and carry it around the end of the table, a second chain carrying cleats positioned beneath the other straight portion of the cam track adjacent to the cutting and stitching station, and means for operating said second chain at a constant rate of speed whereby sponge holding devices may be intermittently positioned and removed from the assembling station and may be caused to move steadily past a cutter and needle in the stitching station.

29. A surgical sponge making machine comprising a frame, a pair of plates having a constrictable opening, means for positioning an absorbent center within a gauze casing in said constrictable opening in such a fashion that the excess portions or tails of the casing are directed outwardly beyond a stitching edge on one of said plates, a third plate, means for moving said stitching edge over the third plate so as to engage the tails between the stitching edge and the third plate, a rotatable worm device positioned close to the third plate on the same side as the first two plates and adjacent to the stitching edge of one of said plates, means for rotating said worm so as to draw the tails tightly between the constrictable opening on the first two plates on the one hand and the worm and third plate on the other, a cutter positioned so as to sever said tails parallel to the stitching edge of the first plate as it moves past the cutter, a suction tube for removing said severed tail portion, and a needle for making a buttonhole stitch around the cut ends on the surgical sponge.

30. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage pivoted on a horizontal shaft mounted on said frame, a gauze supporting means and a core member supporting means mounted on said carriage and positioned adjacent the assembling station when the carriage is in horizontal position, means for rotating the carriage approximately 90 degrees on the shaft to a vertical position, and means for feeding downwardly gauze and the core member material onto their supporting means into a selected relationship.

31. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage pivoted on a horizontal axis shaft mounted on the carriage, support means for a swatch of gauze and for a core member mounted on said carriage adjacent to the assembling station when the carriage is in a horizontal position, means for rotating the carriage around the shaft so that the support means move into a vertical position, and means for feeding a swatch of gauze and a section of core member concurrently onto the support means in a downwardly direction during the last portion of the movement of the carriage into a vertical position.

32. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage pivoted on a horizontal shaft mounted in the frame, support means for a swatch of gauze and a core member mounted on said carriage and positioned adjacent the assembling station when the carriage is in a horizontal position, means for rotating the carriage around the shaft so that the supporting means swing into a vertical position, means for feeding a length of gauze and core member material from rolls adjacent the supporting means during said rotating movement, means for returning the carriage to its horizontal position, and means for cutting a swatch of gauze and a core member from their main body portions as the supporting means return to horizontal position at the assembling station.

33. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage mounted on a horizontal shaft disposed on the frame, a support for a swatch of gauze positioned above a support for a core member and so mounted on said carriage as to be adjacent the assembling station when the carriage is in horizontal position, means for guiding gauze from a gauze roll to the gauze support and means for feeding cotton rope to the core member support means for moving the carriage into a vertical position and for concurrently functioning the gauze and rope feeding means sufficiently to deliver a selected length of gauze and cotton rope to their respective supports, means for returning the carriage to its horizontal position, means for severing that swatch of gauze and that section of cotton rope resting on the respective supports from the gauze roll and main body of the rope, and means for moving said core member and gauze swatch into the assembling means on the frame.

34. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage pivoted on a horizontal shaft disposed on said frame, means on the carriage for supporting a section of gauze above a section of core material in vertical alignment with the means on the frame for positioning a core member within a gauze swatch while the carriage is in horizontal position, means for rotating the carriage around the shaft so that said two support means are in a vertical position, means for feeding downwardly onto the respective support means selected lengths of gauze and cotton rope from the ends of rolls, single means for proportionately adjusting both the amount of gauze and the amount of cotton rope fed onto the supporting means, means for returning the carriage to its horizontal position and for concurrently severing from the respective rolls the lengths of gauze and cotton rope on the respective supporting means, and means for pushing the length of cotton rope upwardly into the gauze and thence into the positioning means on the frame.

35. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage pivoted on a horizontal shaft disposed on said frame, means on the carriage for supporting a section of gauze above a section of core material in vertical alignment with the means on the frame for positioning a core member within a gauze swatch while the carriage is in horizontal position, means for rotating the carriage around the shaft so that said two support means are in a vertical position, a gauze feed roll positioned to feed gauze to the gauze supporting means, a core member feed roll positioned to feed core material to the core member supporting means, a gear mounted on said carriage and drivingly connected to both the gauze feed roll and the core member feed roll, an arm mounted on the shaft carrying the gear, a pawl on said arm engaging the teeth of said gear, and means mounted on the frame engageable with said arm for limiting the movement of the arm, whereby rotating the carriage through a distance which causes the arm to move more than the range permitted by its limiting means will cause the arm to rotate the gear and thereby drive both the gauze feed roll and the core member feed roll.

36. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity the ends of a roll of gauze and cotton rope into a selected relative position to each other and for thereafter moving them into position at the assembling station, said means comprising a carriage pivoted on a horizontal shaft disposed on said frame, means on the carriage for supporting the ends of the gauze roll and material of the core member in vertical alignment with the means for positioning the core member within the gauze swatch while the carriage is in horizontal position, means for rotating the carriage around the shaft so that said two support means are in a vertical position, means for feeding downwardly onto the respective support means a selected length of the ends of the gauze and rope, and means for severing the selected length of gauze and cotton rope from their respective main portions as the carriage is swung back from vertical position to horizontal position.

37. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity the ends of a roll of gauze and cotton rope into a selected relative position to each other and for thereafter moving them into position at the assembling station, said means comprising a carriage pivoted on a horizontal shaft disposed on said frame, means on the carriage for supporting the ends of the gauze roll and material of the core member in vertical alignment with the means for positioning the core member within the gauze swatch while the carriage is in horizontal position, means for rotating the carriage around the shaft so that said two support means are in a vertical position, means for feeding downwardly onto the respective support means a selected length of the ends of the gauze and rope, and means for severing the selected length of gauze and cotton rope from their respective main portions as the carriage is swung back from vertical position to horizontal position comprising knives functioned by lever trains in response to cams fixed on the machine frame.

38. A surgical sponge making machine comprising a frame, means on the frame for positioning at an assembling station a first component or core member within a second component or gauze swatch to form a sponge, means for gathering together the ends of the swatch around the core member, means for stitching the gathered ends to form a surgical sponge, and means in advance of the assembling station for feeding downwardly with gravity both components of the sponge into a selected relative position to each other and for thereafter moving them into position at the assembling station, said means comprising a carriage pivoted on a horizontal shaft disposed on said frame, means on the carriage for supporting a section of gauze above a section of core material in vertical alignment with the means on the frame for positioning a core member within a gauze swatch while the carriage is in horizontal position, means for rotating the carriage around the shaft so that said two support means are in a vertical position, means for feeding downwardly onto the respective support means selected lengths of gauze and cotton rope from the ends or rolls, means for severing selected lengths of gauze and cotton rope from their main body portions near the end of the movement of the carriage back to horizontal position, poker means mounted on the carriage for positioning the severed core member within the severed length of gauze in the positioning means on the frame at the assembling station, and means mounted on the frame of the machine for functioning said poker means.

39. The method of making a surgical sponge which comprises positioning the end of a roll of gauze across an opening in a holding means, of then positioning the end of a roll of cotton rope adjacent the gauze on the side away from the opening, of concurrently severing the end section of the cotton rope and the end section of the gauze from their respective rolls while pushing the severed section of the cotton rope against the severed section of the roll and thence through the opening, of terminating the pushing of the end section of the cotton rope through the opening the moment it is substantially through so that the gauze which is enveloping the rope will have its ends or tails projecting on the first side of the opening, and of thereafter gathering the tails tightly together and stitching them to form a surgical sponge.

40. The method of making a surgical sponge from cotton rope and flat gauze which comprises the steps of cutting off a selected length of cotton rope to form a cylindrical core member, of bending said cylindrical core member longitudinally at right angles to its axis by forcing it through an opening that is slightly smaller than the length of the core member whose plane is parallel to the axis of the core member immediately prior to the forming step while concurrently wrapping gauze around the bent core, and of stitching together the ends of the gauze sufficiently tightly so as to hold the core partly in its bent condition.

41. The method of making a surgical sponge which comprises the steps of feeding downwardly in side-by-side relationship a section of gauze casing and a section of cotton rope so that the rope section is centrally positioned with respect to the gauze casing section, of positioning the two sections adjacent an opening in a formative member with the gauze section between said opening and the rope section, of forcing the section of cotton rope against the section of gauze casing and through the opening to form a surgical sponge, and of stitching the ends of the section of gauze casing so as to hold the section of cotton rope therein.

42. The method of making a surgical sponge which comprises the steps of feeding downwardly in side-by-side relationship a section of gauze casing and a section of cotton rope so that the rope section is centrally positioned with respect to the gauze casing section, of moving the gauze casing and cotton rope sections so related to each other into a horizontal position with the gauze casing on top beneath an opening in a formative member, of forcing the section of cotton rope against the section of gauze casing and through the opening to form a surgical sponge, and of stitching the ends of the section of gauze casing so as to hold the section of cotton rope therein.

CARL W. MOTT.